United States Patent
Shiroishi et al.

(10) Patent No.: US 8,643,972 B2
(45) Date of Patent: Feb. 4, 2014

(54) MAGNETIC STORAGE APPARATUS, HEAD DRIVE CONTROLLER, AND HEAD DRIVE CONTROL METHOD

(75) Inventors: Yoshihiro Shiroishi, Hachioji (JP); Hiroshi Fukuda, Tokyo (JP); Ikuya Tagawa, Hiratsuka (JP); Tomohiro Okada, Odawara (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 13/401,884

(22) Filed: Feb. 22, 2012

(65) Prior Publication Data

US 2013/0083423 A1    Apr. 4, 2013

(30) Foreign Application Priority Data

Sep. 29, 2011  (JP) ................................. 2011-213976

(51) Int. Cl.
   *G11B 11/00*    (2006.01)
(52) U.S. Cl.
   USPC ........................................ 360/59; 360/125.74
(58) Field of Classification Search
   USPC ............... 360/128, 125.31, 324, 123.01, 122, 360/137, 125.74, 59; 369/13.33, 13.31, 369/13.32, 13.03
   See application file for complete search history.

(56) References Cited

U.S. PATENT DOCUMENTS

| | | | |
|---|---|---|---|
| 7,616,412 B2 | 11/2009 | Zhu et al. | |
| 8,120,875 B2* | 2/2012 | Takagishi et al. | 360/125.31 |
| 8,325,442 B2* | 12/2012 | Koui et al. | 360/128 |
| 2005/0213250 A1 | 9/2005 | Kurita et al. | |
| 2005/0219771 A1 | 10/2005 | Sato et al. | |
| 2006/0082930 A1 | 4/2006 | Fukui et al. | |
| 2007/0195461 A1 | 8/2007 | Kajitani | |
| 2008/0024896 A1 | 1/2008 | Ohta et al. | |
| 2009/0059417 A1 | 3/2009 | Takeo et al. | |
| 2010/0007996 A1* | 1/2010 | Iwasaki et al. | 360/324 |
| 2010/0134922 A1* | 6/2010 | Yamada et al. | 360/123.01 |
| 2011/0128648 A1 | 6/2011 | Ezawa et al. | |
| 2011/0216435 A1 | 9/2011 | Shiimoto et al. | |

FOREIGN PATENT DOCUMENTS

| | | |
|---|---|---|
| JP | 7-244801 | 9/1995 |
| JP | 2005-276284 | 10/2005 |

(Continued)

OTHER PUBLICATIONS

Y. Shiroishi et al., Future Options for HDD Storage, IEEE Transactions on Magnetics, Oct. 2009, pp. 3816-3822, vol. 45, No. 10
Xiaochun Zhu et al., Bias-Field-Free Microwave Oscillator Driven by Perpendicularly Polarized Spin Current, IEEE Transactions on Magnetics, Oct. 2006, pp. 2670-2672, vol. 42, No. 10. .

(Continued)

*Primary Examiner* — Nabil Hindi
(74) *Attorney, Agent, or Firm* — Antonelli, Terry, Stout & Kraus, LLP.

(57) ABSTRACT

A magnetic storage apparatus includes a magnetic recording medium, a microwave assisted magnetic recording head at least equipped with a magnetic recording pole that generates a recording magnetic field for writing to the magnetic recording medium and a high-frequency oscillator that generates a high-frequency field, a magnetic reproducing head that reads information from the magnetic recording medium, a signal processing unit that processes a signal written by the magnetic recording head and a signal read by the magnetic reproducing head and a unit that controls clearance between the high-frequency oscillator and the magnetic recording medium. The magnetic storage apparatus has a characteristic that the high-frequency oscillator is not operated except in recording.

24 Claims, 13 Drawing Sheets

(56) References Cited

FOREIGN PATENT DOCUMENTS

| JP | 2005-285242 | 10/2005 |
|----|-------------|---------|
| JP | 2006-114159 | 4/2006 |
| JP | 2007-220232 | 8/2007 |
| JP | 2008-34004 | 2/2008 |
| JP | 4255869 | 2/2009 |
| JP | 2009-64499 | 3/2009 |
| JP | 2011-113621 | 6/2011 |
| JP | 2011-187092 | 9/2011 |

OTHER PUBLICATIONS

Jian-Gang Zhu et al., Microwave Assisted Magnetic Recording, IEEE Transactions on Magnetics, Jan. 2008, pp. 125-131, vol. 44, No. 1.

S. Okamoto et al., Microwave assisted switching mechanism and its stable switching limit, Journal of Applied Physics 107, 123914, (2010).

Office Action in corresponding Japanese Appln No. 2013-040531, dated May 28, 2013 and English language translation of office action.

* cited by examiner

FIG. 3

| | EMBODIMENT 1a | EMBODIMENT 1b | EMBODIMENT 1c |
|---|---|---|---|
| 112 | TMR ($T_{wr}$=33nm) | TMR ($T_{wr}$=29nm) | TMR ($T_{wr}$=25nm) |
| 122 | CoFe ($T_{ww}$=45nm) | CoFe ($T_{ww}$=42nm) | CoFe ($T_{ww}$=35nm) |
| 130 | SUBSTRATE: 2.5" φ GLASS D4OH(1nm)/C(2nm)/CoCrPtB(4nm)/ CoCrPtSiO$_2$(12nm)/Ru(10nm)/ CoFeTaZr(40nm) | SUBSTRATE: 3.5" φ NiP PLATED Al ALLOY D4OH(1nm)/C(1.9nm)/CoCrPtB(3.5nm)/ CoCrPtSiO$_2$(12nm)/Ru(10nm)/ CoFeTaZr(15nm)/Ru(0.5nm)/ CoFeTaZr(15nm) | SUBSTRATE: 2.5" φ GLASS D4OH(1nm)/C(1.8nm)/CoCrPtB(3nm)/ CoCrPtSiO$_2$(12nm)/Ru(10nm)/ CoFeTaZr(50nm)/Ru(0.5nm)/ CoFeTaZr(15nm) |
| 140 | $W_{FGL}$=45nm CoFe(10nm)/Cu(3nm)/Co/Ni(10nm) | $W_{FGL}$=42nm CoFeGe(12nm)/Cu(3nm)/Co/Ni(8nm) | $W_{FGL}$=28nm Co/Fe(10nm)/Cu(3nm)/Co/Ni(10nm) |
| 150 | FEMTO: 0.85×0.7×0.23nm | LONG FEMTO: 1×0.7×0.23nm | THIN TYPE FEMTO: 0.85×0.7×0.2nm |
| 151 | FCAC(2nm) | FCAC(1.8nm) | FCAC(1.5nm) |

MAGNETIC STORAGE APPARATUS, HEAD DRIVE CONTROLLER, AND HEAD DRIVE CONTROL METHOD

INCORPORATION BY REFERENCE

The present application claims priority from Japanese application serial No. 2011-213976, filed on Sep. 29, 2011, the entire contents of which are hereby incorporated by reference into this application.

FIELD OF THE INVENTION

The present invention relates to a magnetic storage apparatus which is equipped with a magnetic recording head provided with a function for inducing a magnetic medium magnetization reversal by applying a high-frequency field to the magnetic recording medium, a head drive controller and its control method.

BACKGROUND OF THE INVENTION

Recently, the amount of generated information rapidly increases because of the extension of data centers and others as a result of the evolution of the Internet environment, the infiltration of cloud computing and others. It can be safely said that a magnetic storage apparatus such as a magnetic disk unit (HDD) the recording density of which is the highest and which is excellent in a bit cost plays a leading role of a storage in the age of big data. Therefore, the great increase of the capacity of the magnetic storage apparatus and the densification that supports it are essential.

High densification is based upon a scaling rule and it is essential to reduce the track pitch of a magnetic head, spacing between the head and a medium, a crystal grain of the medium and others. However, when the crystal grain of the medium is reduced, anisotropic energy which tries to keep a magnetized state is reduced and the recorded magnetized state is apt to be disturbed by thermal disturbance. This phenomenon is called superparamagnetic effect. Therefore, as described in Y. Shiroishi, et al, "Future Options for HDD Storage", IEEE Trans. Magn. Vol. 45, no. 10, pp 3816-3822 (2009), it is said that in a generation of approximately 1 Tb/in$^2$, the mere extension of the current technique will hit on a wall that shows a limit of practicality. This is called superparamagnetic limit or trilemma.

For high densification, it is the maximum subject to develop technique that surpasses this, and in the meantime, proposed in JP-A No. 1995-244801 is a spin heating recording method of supplying a high-frequency field that meets a magnetic resonance condition to a magnetic recording medium by making a high frequency source provided outside follow the motion of a magnetic head and also enabling writing to the high-coercive force medium with the low magnetic field without practically raising the temperature of the medium utilizing the nature that the spin of the magnetic recording medium absorbs the energy of the high-frequency field and the coercive force is effectively reduced.

In such a spin heating recording method, since the high-frequency field in which power is concentrated in a frequency range in which the magnetic resonance condition is met is applied, only spin is selectively excited, that is, spin heating is enabled without too much exciting a degree of internal freedom of the plasma oscillation and the lattice vibration of a conduction electron except spin, and the rise of the temperature of the whole medium such as a temperature in general heating is not caused. The above-mentioned method of applying the high-frequency field in a microwave band to the magnetic recording medium and performing magnetic recording utilizing the magnetic resonance phenomenon is called microwave assisted magnetic recording (MAMR)(the above-mentioned "Future Options for HDD Storage").

In addition, for another method of utilizing a high-frequency field, disclosed in JP-A No. 2008-34004 is a thermally assisted magnetic recording method of applying a writing magnetic field to at least a part of the following part and writing to a magnetic recording medium after heating the following part by applying a high-frequency field in a part of a magnetic recording layer or in the vicinity of the part and generating eddy current and temporarily reducing the coercive force of the part. Further, as a method of simply radiating energy in the thermally assisted magnetic recording method, disclosed in JP-A No. 2005-285242 is a spin torque type or a spin resonance type spin microwave generator provided with at least two magnetic thin films as a high-frequency oscillator.

Recently, a practical spin torque oscillator (STO) having microstructure utilizing a field generation layer (FGL) that generates a high-frequency field with high-speed spin by spin torque is proposed in X. Zhu and J.-G. Zhu, "Bias-field-free microwave oscillator driven by perpendicularly polarized spin current", IEEE Trans. Magn., vol. 42, pp. 2670-2672, 2006 and U.S. Pat. No. 7,616,412B2. Next, disclosed in J-G. Zhu, X. Zhu, and Y. Tang, "Microwave Assisted Magnetic Recording", IEEE trans. Magn., Vol 44, no. 1, pp 125-131 (2008) is a microwave assisted recording method for realizing densification of arranging a high-frequency oscillator (STO) having the same type structure next to a main magnetic pole of a vertical head, exciting the precession of medium magnetization with a high-frequency field in a microwave band from STO and magnetically recording information in a magnetic recording medium provided with large magnetic anisotropy, reducing a switching field.

Further, disclosed in JP Patent No. 4255869 is a method of more efficiently inducing the reversal of magnetization by making a high-frequency field oscillator generate a high-frequency field having spin in the same direction as a direction of the precession of the magnetization of a magnetic recording medium for which the reversal of magnetization is desired according to the polarity of a recording magnetic field. Hereby, research and development for realizing the microwave assisted recording method are recently accelerated rapidly, and disclosed in JP-A No. 2011-113621 is for the practical application of the method, a head drive controller that supplies a high-frequency oscillator driving signal at a higher level than a steady level by fixed effective time according to input to a write gate in a state in which a recording magnetic field is applied so as to secure the reliability of a high-frequency oscillator required for microwave assisted recording and securely maintain its oscillation.

SUMMARY OF THE INVENTION

However, in JP-A No. 1995-244801 and JP Patent No. 4255869 and in "Bias-field-free microwave oscillator driven by perpendicularly polarized spin current" and "Microwave Assisted Magnetic Recording", a detailed flow for applying the high-frequency generator having new structure using spin torque effect by spin transfer to an actual magnetic storage apparatus, reproducing a record using the microwave assisted recording method and appropriately using the high-frequency generator efficiently is not sufficiently researched, and the detailed flow and the problem are not disclosed, either. This situation is also similar in a thermally assisted method of heating using a high-frequency field as in JP-A No. 2008-

34004 and No. 2005-285242. The inventors have earnestly researched and tested a magnetic storage apparatus in which a high-frequency generator is built on the similar various environmental conditions to those in the conventional type; though the densification of recording can be achieved, it is clarified that there are the following large problems for practical application.

The maximum problem is that information disappears or information is rewritten even in a state in which a recording head is not operated in reproducing information and in seeking depending upon external environment although a sufficient measure for a leakage magnetic field is applied to a magnetic head as the extension of such the related art as described in JP-A No. 2006-114159. The inventors have earnestly researched this fundamental cause in both Landau-Lifshitz-Gilbert (LLG) simulation and experiments; it is clarified that this phenomenon is caused because even a minute stray magnetic field from servo information, recorded information and others in external equipment and in a magnetic recording medium for which a sufficient measure is taken in the conventional type recording method has a large effect upon a high-frequency field oscillator and the high-frequency field oscillator also acts on the magnetic recording medium in non-recording such as in reproducing information or in seeking.

Further, in trial manufacture for mass production, it is also clarified that there is a problem that the yield in manufacture of a magnetic storage apparatus when a high-frequency field generator having new structure is built in the magnetic storage apparatus and the storage is operated is extremely low, compared with the yield of a conventional type head. According to research using the LLG simulation by the inventors, it is clarified that this is caused because the high-frequency field strength and the oscillation frequency of the high-frequency generator using spin torque effect have strong dependence upon the dimensions of the generator, further, as response time for recording current also dispersed in a recording head magnetic field that has a strong effect upon these oscillation characteristics, magnetic domain structure control technique and working precision respectively exceeding those of a conventional type head are required, further, a dynamic exciting process of the precession of the magnetization of a medium by a high-frequency field is extremely intricate and assist effect itself also strongly depends upon dispersion in a manufacturing process of a magnetic recording medium and a magnetic head and the dependence upon temperature of a constant of material.

As described above, to apply the microwave assisted recording method to an information storage, it is clarified that it is a maximum subject to conquer the problem of elimination and a wrong record (a recorded state varied to a different state from a state in recording) and the problem that the manufacturing yield of the magnetic storage apparatus according to this method is especially low. These problems essentially arise in that the process for exciting the precession of the magnetization of a medium by the high-frequency oscillator is a very intricate dynamic-probability phenomenon and process technique that greatly exceeds a limit of the related art is required as described above. Accordingly, to practically applying the microwave assisted recording method, measures at a level of the storage based upon the recognition of the essence of the problems are essential and the essence is a problem to be solved by the present invention. That is, an object of the present invention is to provide a mass reliable magnetic storage apparatus provided with high reliability, a high manufacturing yield and high recording density.

This application includes plural means to solve the above-mentioned problems and to achieve the object, however, an example of the means is a magnetic storage apparatus provided with a magnetic recording medium, a microwave assisted magnetic recording head at least including a magnetic recording pole that generates a recording magnetic field to write to the magnetic recording medium and a high-frequency field oscillator that generates a high-frequency field, a magnetic reproducing head that reads information from the magnetic recording medium, means that control and processes the recording operation of the magnetic recording head and the reproducing operation of the magnetic reproducing head and means that controls clearance (spacing) between the high-frequency field oscillator and the magnetic recording medium. The magnetic storage apparatus according to the present invention has a characteristic that at least at primary time (in time in which a signal is substantially read) in reproducing information, the high-frequency field oscillator is energized with current of reverse polarity to polarity in operation or the high-frequency field oscillator is set by means that prevents current from flowing not to operate the high-frequency field oscillator except in recording.

It is desirable when the storage is switched to recording operation that the energization of the high-frequency field oscillator is completed before the supply of recording current to the main magnetic pole, and it is more desirable that the adjustment in recording operation of recording current to the magnetic recording pole, operating current to the high-frequency oscillator and the clearance control means is also made in manufacturing the storage and further, in operating the storage.

The present invention reduces the probability of the elimination of information, a wrong record and others in the microwave assisted magnetic recording method more than the conventional type vertical recording method by inhibiting microwave assisted effect by the high-frequency field oscillator except in recording and further, can provide the mass reliable magnetic storage apparatus provided with high reliability, a high manufacturing yield and high recording density further by supplying driving current to the microwave assist oscillator before the supply of magnetic recording head exciting current, that is, before a recording magnetic field is applied and further, also adjusting the timing in manufacturing the storage, more desirably in the operation of the storage.

BRIEF DESCRIPTION OF THE DRAWINGS

FIG. 3 shows an embodiment of the magnetic head and the magnetic recording medium according to the present invention;

DETAILED DESCRIPTION OF THE PREFERRED EMBODIMENTS

Figure 1A:
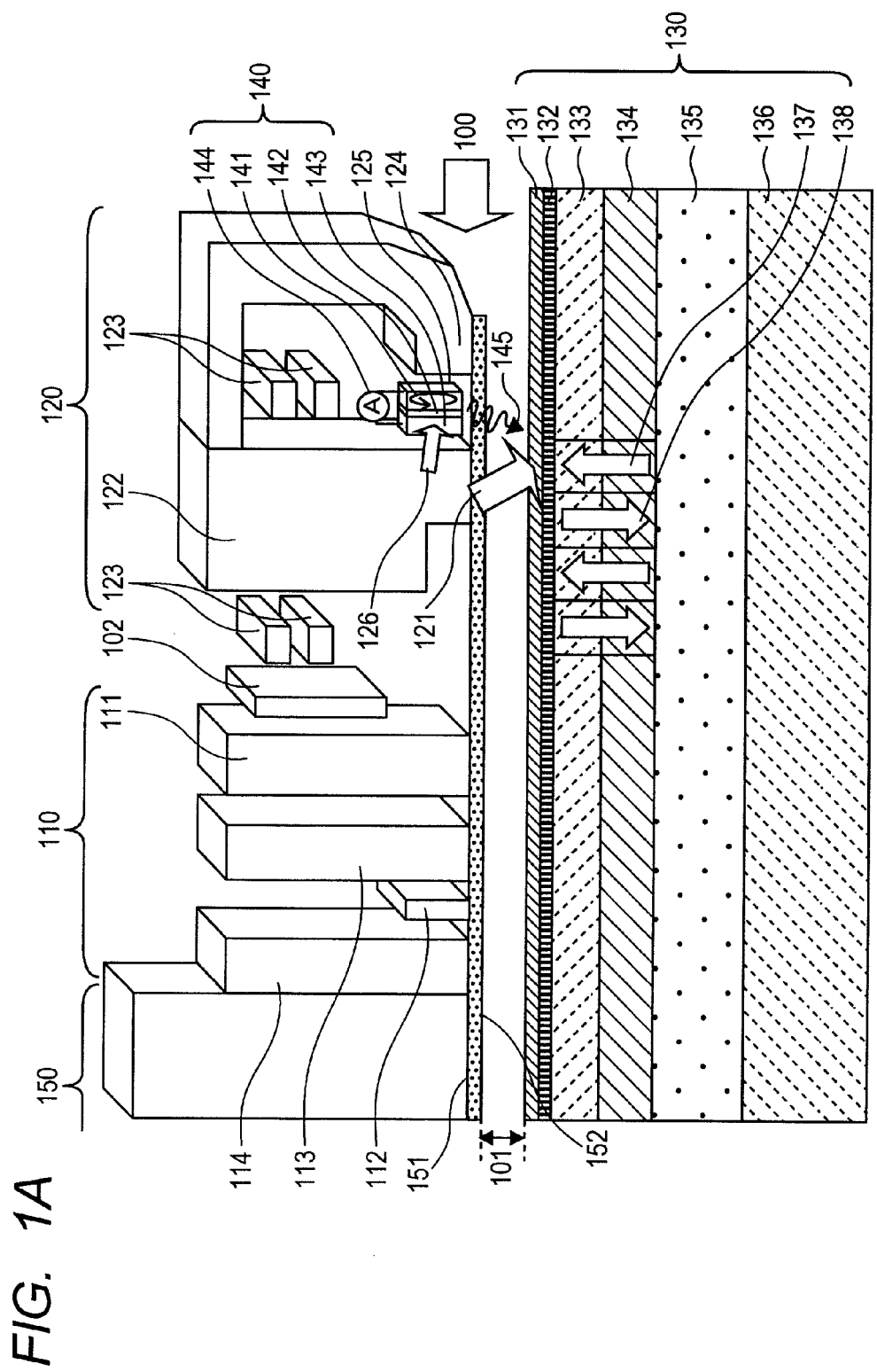
FIG. 1A is an example of a conceptual drawing showing a magnetic head and a magnetic recording medium according to the present invention.

Referring to the drawings, embodiments will be described below.

First Embodiment

FIG. 1A is a schematic diagram showing a magnetic recording/reproducing head which is a part of a constitutional example of a magnetic storage apparatus according to the present invention. The magnetic recording/reproducing head is mainly configured by a reproducing head part 110 and a recording head part 120 respectively formed on a slider 150 run in a direction shown by an arrow 100 via clearance 101 over a magnetic recording medium 130, and a thermal flying height controller TFC 102 for controlling the clearance as described in JP Patent No. 4255869. The TFC 102 is made of high-resistivity high-thermal expansion material such as an Ni—Fe alloy and is formed of an exothermic resistor thin film of approximately 50 to 150Ω insulated by an alumina film and others. A head protective layer 151 is made of CVD-C, filtered cathodic arc carbon (FCAC) and others and its bottom face 152 is equivalent to an air baring surface (ABS) of the magnetic recording/reproducing head. Etching work is applied to the slider 150 so as to generate negative pressure on the ABS made of an Al$_2$O$_3$—TiC ceramic so that a recording element part of the magnetic head is floating by approximately 10 nm from the whole circumference of the magnetic recording medium as described in JP-A No. 2007-220232, and the size is approximately 0.85 mm×0.7 mm×0.23 mm in a femto type. In this embodiment, the magnetic recording medium 130 is relatively moved in a state in which the reproducing head part 110 is located at the head and the recording head part 120 is located at the back as to the magnetic recording/reproducing head. However, the magnetic recording/reproducing head may also have a reverse configuration and no head protective layer may also be provided.

The reproducing head part 110 is configured by a shielding layer 111, a reproducing sensing element 112, an upper magnetic shield 113 and a lower magnetic shield 114. The reproducing sensing element 112 plays a role of reproducing a signal from the medium, may also be capable of tunneling magneto-resistive (TMR) effect, current perpendicular to plane (CPP)-giant magneto-resistance (GMR) effect and extraordinary magneto-resistive (EMR) effect, as well as spin torque oscillator (STO) effect, and the reproducing sensing element may also be a so-called differential type. The width $T_{Wr}$ of the reproducing sensing element is designed and worked according to a target recording magnetic field and target recording density, and the dimension is approximately 80 to 5 nm. In FIG. 1A, an output terminal is omitted.

The recording head part 120 is configured by a high-frequency oscillator 140 for generating a high-frequency field 145, a magnetic recording pole (a main magnetic pole) 122 for generating the magnetic recording field 121, an auxiliary magnetic pole 124 for controlling a magnetizing rotational direction and others of the high-frequency oscillator 140 and a coil 123 made of Cu and others for energizing the magnetic recording pole. A magnetic gap 125 is provided between the magnetic recording pole 122 and the auxiliary magnetic pole 124 and an oscillation control magnetic field 126 controls a magnetizing direction, a magnetizing rotational direction and others of the high-frequency oscillator 140.

A high-saturation magnetic flux soft magnetic film made of FeCoNi, a Co—Fe alloy and others of the magnetic recording pole 122 is produced by plating or sputtering, the magnetic recording pole is in the shape of a trapezoid the bevel angle of which is 10 to 20 degrees, and the magnetic recording pole is formed so that its cross-sectional area decreases near to the ABS. The width $T_{ww}$ of a recording element on the wider side of the trapezoid-shaped magnetic recording pole is designed and worked according to a target recording magnetic field and target recording density, and the dimension is approximately 160 to 10 nm. Further, it is desirable that the magnetic recording pole 122 in the present invention is formed by a soft magnetic alloy thin film made of a CoNiFe alloy, an Ni—Fe alloy and others together with the auxiliary magnetic pole 124 and so-called wrap around structure (WAS) in which a circumference of the soft magnetic alloy thin film is enclosed by a non-magnetic layer is adopted.

The high-frequency oscillator 140 is configured by a field generation layer FGL 141 made of a soft magnetic alloy such as FeCo and NiFe, a hard magnetic alloy such as CoPt and CoCr, a magnetic alloy having negative perpendicular magnetic anisotropy such as Fe$_{0.4}$Co$_{0.6}$, Fe$_{0.01}$Co$_{0.99}$ and Co$_{0.8}$Ir$_{0.2}$, Heusler alloy such as CoFeGe, CoMnGe, CoFeAl, CoFeSi and CoMnSi, an Re-TM amorphous alloy such as TbFeCo or a magnetic artificial grating such as Co/Fe and Co/Ir, an intermediate layer 142 made of non-magnetic conductive material such as Au, Ag, Pt, Ta, Ir, Al, Si, Ge, Ti and Cu, further, a spin torque transfer reference layer 143 for applying spin torque to the field generation layer FGL and others.

The width $W_{FGL}$ of the FGL 141 is designed and worked according to a target recording magnetic field and target recording density, and the dimension is approximately 150 to 5 nm. It is desirable that the thickness of the non-magnetic intermediate layer 142 is approximately 0.2 to 4 nm so as to obtain the high efficiency of spin torque transfer, and since the oscillation of the FGL can be stabilized by using material having perpendicular magnetic anisotropy for the spin torque transfer reference layer 143, it is desirable that for the spin torque transfer reference layer, artificial magnetic material such as Co/Pt, Co/Ni, Co/Pd and CoCrTa/Pd is used. Further, to stabilize the high-frequency magnetization spin of the FGL 141, a spin guide ferromagnetic layer having the similar configuration to the spin torque transfer reference layer 143 may also be provided next to the FGL 141. In addition, the laminated order of the spin torque transfer reference layer 143 and the FGL 141 may also be reversed. Spin is supplied from a direct voltage source 144 to the FGL 141 and others. In FIG. 1A, however, a terminal for supplying current is omitted to show the structure.

Figure 1B:
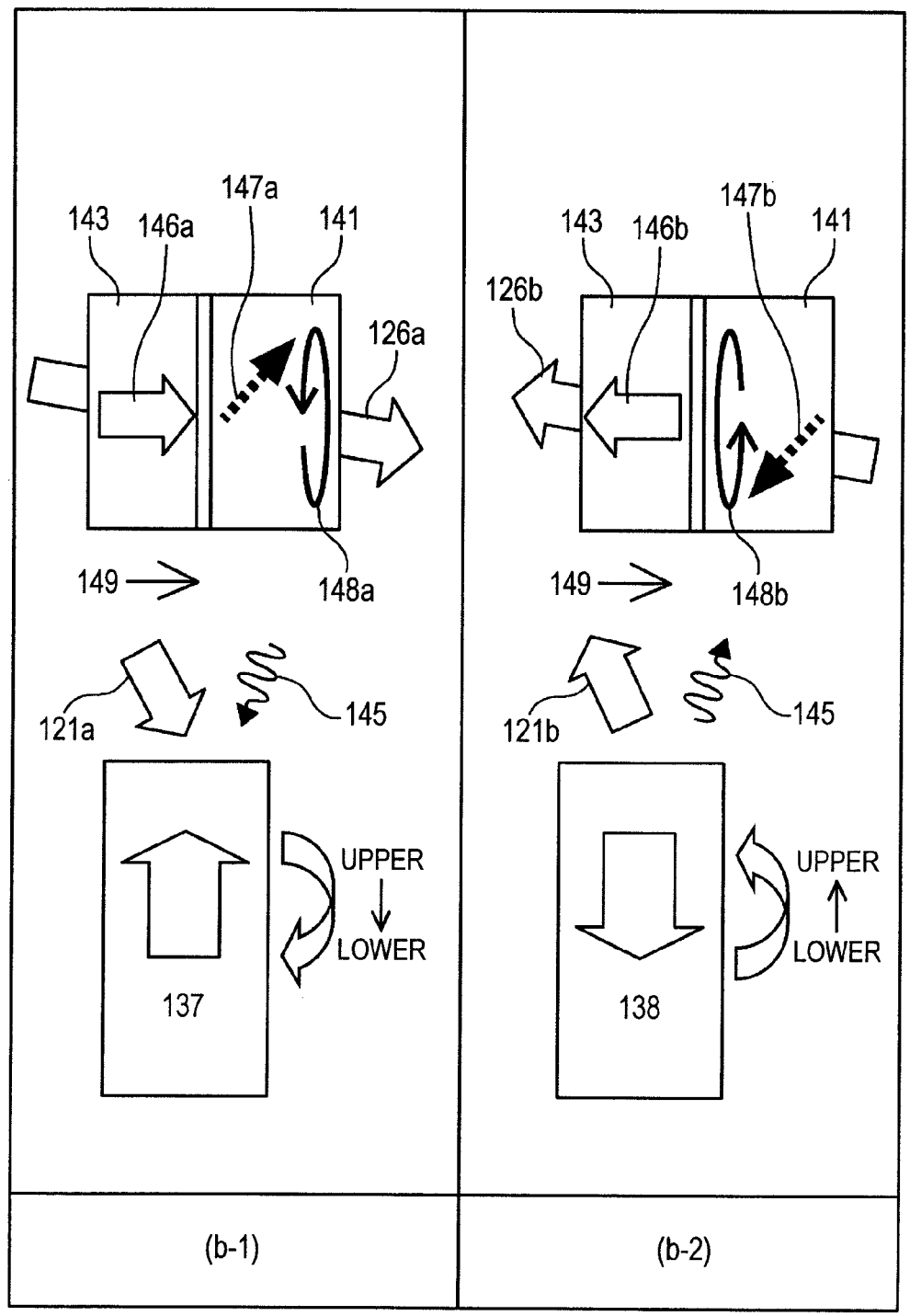
FIG. 1B shows a magnetized state of each layer of a high-frequency oscillator.

FIG. 1B schematically shows a magnetized state of each layer of the high-frequency oscillator 140 in recording in the magnetic recording medium 130. In FIG. 1B, arrows 146 show the magnetization of the spin torque transfer reference layer 143, arrows 147 show the magnetization of the field generation layer (FGL) 141, arrows 148 show rotational directions of the magnetization 147 of the field generation layer (FGL), and arrows 149 show direct current supplied from the source 144 to the high-frequency oscillator.

FIG. 1B (b-1) shows a conceptual drawing when upward magnetization 137 recorded in magnetic layers 133, 134 of the magnetic recording medium 130 is varied to downward magnetization. In this case, recording current is supplied from the magnetic recording pole 122 to the coil 123 of the recording head part so as to generate a downward recording magnetic field 121a shown in FIG. 1A. At this time, a part 126 of the magnetic field from the magnetic recording pole 122 is also generated in the cap 125 toward the auxiliary magnetic pole 124. As shown in FIG. 1A, the structure and the materials of the magnetic recording pole 122, the auxiliary magnetic pole 124, the magnetic gap 125 and others and further, the structure and the materials of the high-frequency oscillator 140 are designed beforehand so that a sufficiently strong oscillation control magnetic field 126a to orientate the respective magnetization of the spin torque transfer reference layer 143 and the field generation layer (FGL) 141 rightward is generated.

As shown in FIG. 1B (b-1), the magnetization 147a of the field generation layer 141 is spun counterclockwise (in a direction shown by an arrow 148a) at high speed by setting as described above, and a high-frequency field having the property of assisting the counterclockwise precession of the upward recording magnetization 137 of the magnetic recording medium 130 is generated. Finally, the upward magnetization 137 of the magnetic recording medium 130 is inverted downward by the downward recording magnetic field 121a owing to the assist effect of the high-frequency field 145 and information is rewritten. In this case, the above-mentioned oscillation frequency is determined by the sum of the oscillation control magnetic field 126a and the anisotropic magnetic field of the FGL 141. Therefore, as the anisotropic magnetic field is small when the FGL 141 is configured by a soft magnetic material and a negative perpendicular magnetic anisotropic material for example, the oscillation frequency of the FGL 141 is determined according to the strength of the oscillation control magnetic field 126a. The oscillation control magnetic field from the recording head part is delayed by approximately 0.1 ns for recording head exciting current. Since the delay time varies according to the manufacturing dispersion of the magnetic head, ambient temperature and others, it is desirable that these are compensated as described later.

Next, to the contrary, a case that downward magnetization 138 recorded in the magnetic layers 133, 134 of the magnetic recording medium 130 is varied to upward magnetization will be described using a conceptual drawing shown in FIG. 1B (b-2). First, a strong oscillation control magnetic field 126b in a direction reverse to FIG. 1B (b-1) (a leftward direction) is applied to the spin torque transfer reference layer 143 and the FGL 141, and a direction of the respective magnetization 147b of the spin torque transfer reference layer 143 and the FGL 141 is switched at high speed so that the direction is reverse to the direction shown in FIG. 1B (b-1)(a leftward direction). In this state, the magnetization 147b of the FGL 141 absorbs the energy of spin transferred from the spin torque transfer reference layer 143 and is spun at high speed in reverse spin (a direction shown by an arrow 148b) to FIG. 1B (b-1) when viewed from the magnetic recording medium 130. A property reverse to FIG. 1B (b-1), that is, a high-frequency field having the property of assisting the precession of the downward recording magnetization 138 (assisting inversion to upward magnetization) is generated from the magnetization 147b reversely spun of the FGL 141. Finally, the downward magnetization 138 of the magnetic recording medium 130 is inverted to be upward by upward recording magnetization 121b owing to the assist effect of the high-frequency field 145 and information is rewritten.

Figure 10:
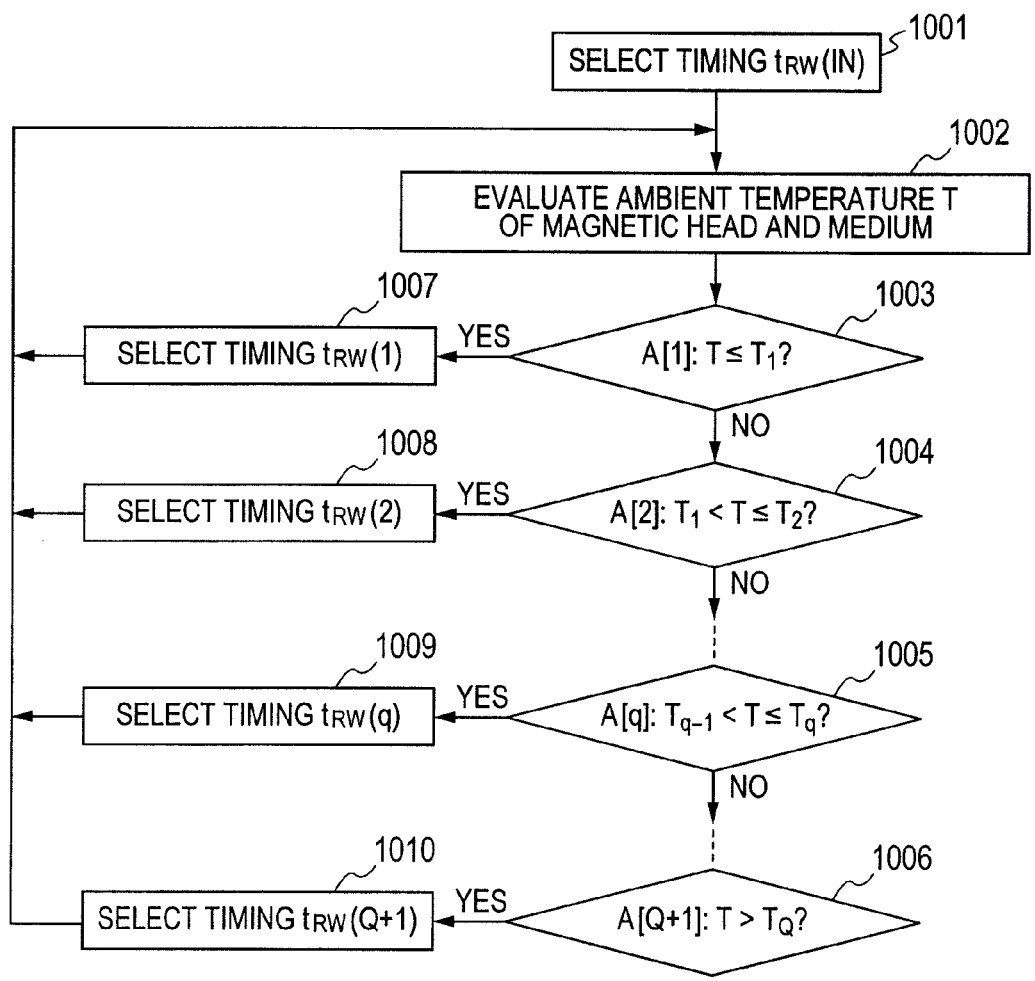
FIG. 10 is an example of a flowchart for setting high-frequency oscillator current operating timing according to the present invention.

FIG. 10 shows one example of relation between magnetic head exciting current and a high-frequency field analyzed by LLG simulation in the magnetic head having the above-mentioned structure according to the present invention. When the polarity of recording current is varied, the oscillation frequency of STO may be slightly disturbed in a time range of 0.1 ns in the combination of its timing and a high oscillation frequency. It is known, however, that a high-frequency field is stably generated. Generally, the oscillation frequency and the strength of a high-frequency field vary together with recording current or time after a magnetic field is switched. Therefore, when the structure and the materials of the magnetic head, the materials, the manufacturing process or the structure of the magnetic recording medium and others are appropriately designed and adjusted as discussed in "Microwave assisted switching mechanisms and its stable switching limit", microwave assisted recording is enabled in which the synchronization of the precession of the magnetization of the medium and a high-frequency field, the absorption of energy from the high-frequency field during the precession and the reduction of a medium switching field are performed.

According to the LLG simulation, to efficiently generate the above-mentioned high-frequency field, it is clarified that the thickness of the FGL 141 is desirably 1 to 100 nm, is more desirably 5 to 30 nm and that it is desirable to substantially equalize the width and the height of the FGL so as to possibly prevent a magnetic domain from being created and enable the stable spin of magnetization. When the dimension of the FGL is approximately 40 to 20 nm or less, the generation of a magnetic domain is inhibited and it is also verified that when a strong magnetic field is applied, any of soft magnetic material, hard magnetic material or negative perpendicular magnetic anisotropic material is stably oscillated. Hereby, it can be said that the microwave assisted recording method is especially suitable for high-density recording. However, it is also clarified that the high-frequency field strength and the oscillation frequency have strong dependence upon the dimension of the FGL and dependence upon a direction and the strength of an oscillation control magnetic field from the magnetic head. These depend not only upon the dispersion of the manufacturing process but upon ambient temperature. Accordingly, to practically apply the microwave assisted method, it is essential to develop and introduce an adjustment method at a level of the magnetic head that hardly depends upon the dispersion of head working dimensions and environmental conditions together with the great enhancement of the working precision of the magnetic head, and the adjustment method will be detailedly described later in this embodiment.

The magnetic recording medium 130 is configured by a soft magnetic underlayer 135 made of FeCoTaZr or others on a non-magnetic substrate 136 made of glass, NiP plated Al or others, first and second recording layers 134, 133 which are magnetic films mainly made of CoCrPt, an $L1_2$-$Co_3Pt$-base alloy, an $L1_2$-$(CoCr)_3Pt$-base alloy, an $L1_1$-$Co_{50}Pt_{50}$-base alloy, CoCrB/Pt, a CoB/Pd magnetic artificial grating or $L1_0$ type FePt, a protective layer 132 made of C or others, a lubricating layer 131 and others. Arrows 137, 138 show upward magnetization and downward magnetization respectively recorded in the magnetic recording medium.

In this case, it is desirable that at least one of the recording layers is made of a material having perpendicular magnetic anisotropy and it is desirable that the resonance frequency of its magnetization and the oscillation frequency of a high-frequency field of the high-frequency oscillator 140 are not greatly different. An intermediate layer for controlling magnetic coupling may also be provided between both layers. Further, at least one non-magnetic layer may also be provided between the soft magnetic underlayer 135 and the substrate 136, and at least one non-magnetic intermediate layer made of Ru or others and a magnetic intermediate layer in addition to the intermediate layer may also be provided between the soft magnetic underlayer 135 and the magnetic layer 134. Further, the soft magnetic underlayer 135 may also be configured by two layers via Ru or others and the magnetic layers 133, 134 may also be configured by only one layer or three or more multiple layers. In this embodiment, the example that the magnetic layers 133, 134 and others are provided on only one side of the substrate 136 is described. However, these may also be provided on both sides of the non-magnetic substrate 136. In this embodiment, the example that each bit continuously exists in the magnetic recording medium 130 is described. However, a magnetic pattern of approximately 10 nm may also be a patterned medium provided on the substrate.

Figure 2:
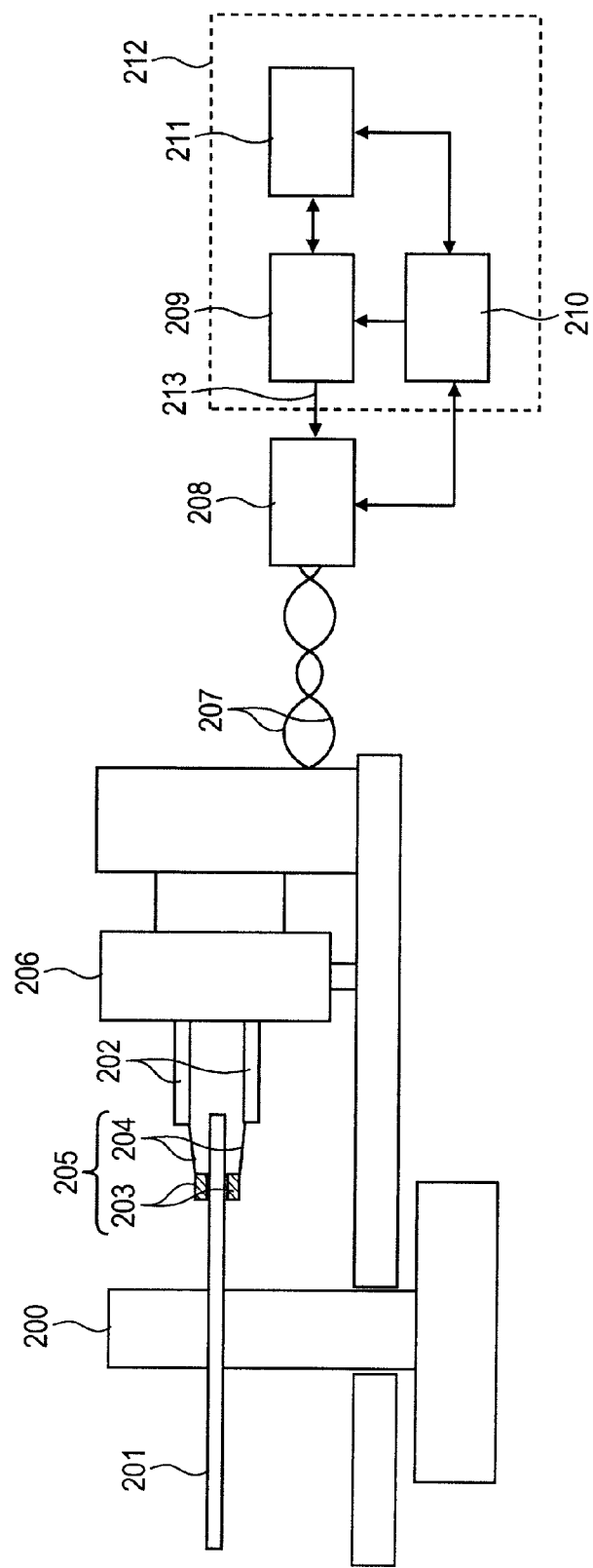
FIG. 2 is an example of a conceptual drawing showing a head drive controller and a magnetic storage apparatus according to the present invention.

FIG. 2 shows an example of the configuration of the magnetic storage apparatus to which the present invention is applied. That is, in this embodiment, the magnetic storage apparatus is configured by a spindle motor 200, the magnetic recording medium 201, an arm 202, the high-frequency oscillator (STO), the recording/reproducing head parts, a magnetic head gimbal assembly (HGA) 205 including a magnetic head slider 203 provided with a clearance controlling element TFC and others and a suspension 204, an actuator 206, a head drive controller (R/W-IC) 208 according to the present invention provided with a high-frequency oscillator drive controller that generates a driving signal (a driving current signal or a driving voltage signal) 207 for driving the STO and others, an R/W channel 209, a microprocessor (CPU) 210, a disk controller (HDC) 211 and others. It is desirable in view of the miniaturization and the lightening of the magnetic storage apparatus that the actuator 206 is a rotary actuator.

The CPU 210 is a main control unit of the magnetic storage apparatus and executes servo control required for recording/reproducing operation and the positioning of the magnetic head. For example, the CPU sets a parameter required for operation in various registers included in the R/W-IC. In the various registers, predetermined temperature, a recording current value per area of the magnetic recording medium, a clearance control value, an STO driving current value, recording current, an overshoot value of STO driving current or timing time and others are independently set as described later.

The HDC 211 also functions as an interface between the magnetic storage apparatus and a high-order host system (not shown), and executes transfer control over recorded/reproduced information by outputting a write gate for instructing a start of information recording (the timing of recording) for writing data to be recorded 213 in the magnetic recording medium to the R/W channel 209.

The R/W channel 209 is a signal processing circuit, outputs a signal 213 acquired by coding the information to be recorded transferred from the disk controller 211 to the R/W-IC when recording information, and outputs regenerative information acquired by decoding a regenerative signal output from the magnetic head gimbal assembly 205 to the disk controller 211 when reproducing information.

The R/W-IC 208 is a driving integrated circuit that generates a recording signal (recording current) corresponding to the data to be recorded 213 supplied at least from the R/W channel 209 according to the input of the write gate and supplies it, to the magnetic head part, together with a high-frequency oscillator (STO) driving signal (a driving current signal or a driving voltage signal) the activating timing of which is controlled includes a register in which a recording current value, an STO driving current value, a TFC input power value and others respectively from the CPU are set, more desirably a setting table including registers, and generates recording current, STO driving current, overshoot and TFC input power based upon the register or the setting table. In this case, each register value can be varied according to condition such as an area of the magnetic recording medium, ambient temperature and atmospheric pressure. The R/W channel 209, the CPU 210, the HDC 211 and others are built in a system integrated circuit (a system on chip (SoC)) 212 of normally one chip.

An outline of recording/reproducing operation in the magnetic storage apparatus according to the present invention will be described below. The magnetic recording medium 201 is rotated at predetermined revolution speed by the spindle motor 200 under control by the CPU 210 which is a main control unit of the magnetic storage apparatus according to an instruction to record or reproduce information from a host such as a personal computer or a high-order system, further, a position on the medium is detected using a signal from servo information recorded in the magnetic recording medium in a manufacturing process of the magnetic storage apparatus beforehand by the reproducing head part, seek operation is performed on a predetermined recording track of the magnetic recording medium by controlling the magnetic head gimbal assembly (HGA) 205 by the actuator 206 via the arm 202, and the following operation of the magnetic head is performed in the position. Next, information is recorded/reproduced on the track as follows.

When recording information, a write gate for instructing a start of data recording (the timing of recording) for writing data to be recorded 213 in the magnetic recording medium is output from the disk controller 211 to the R/W channel 209. A recording signal (recording current) corresponding to the data to be recorded 213 supplied from the R/W channel 209 is generated according to the input of the write gate, driving signal 207 is supplied to the recording head part 120 of the magnetic head 203 together with a high-frequency oscillator (STO) driving signal (a driving current signal or a driving voltage signal) the activating timing of which is controlled, and the data is recorded on a predetermined recording track in the magnetic recording medium by the microwave assisted method.

In the meantime, when reproducing information, a regenerative signal output from the reproducing head part 110 that reads magnetized information recorded in the magnetic recording medium of the magnetic head 203 is amplified in the R/W-IC, transmitted to the R/W channel 209, and decoded there. The regenerative information is output to the disk controller 211.

In this embodiment, a case that one magnetic recording medium and two magnetic head sliders are provided is described. However, one magnetic head slider may also be provided for one magnetic recording medium, and plural magnetic recording mediums and plural magnetic heads may also be provided according to the purpose.

The details including an optimizing method and its effect of this embodiment will be described below.

(Optimizing Method and Effect)

A description will be given below of a method of correcting clearance by recording current $I_W$ to the recording head part 120 (the coil 123), the operating current 144 of the high-frequency oscillator 140 and the thermal flying height controller TFC 102 to compensate the dispersion of performance caused by a leakage magnetic field and the dispersion in the manufacturing process of the recording head part 120 and the high-frequency oscillator 140 and its effect, which are characteristics of the present invention.

The track pitch $T_{WW}$ of the magnetic recording pole 122 and the width $W_{FGL}$ of the field generation layer FGL 141 of the high-frequency oscillator 140 in the recording head part 120, the width $T_{Wr}$ of the reproducing sensing element 112 in the reproducing head part 110 in the above-mentioned configuration, the respective primary configuration, a position and the number of the thermal flying height controller TFC 102, and further, the configuration of the magnetic recording medium 130 are varied as shown in embodiments 1a, 1b, 1c in FIG. 3. Magnetic heads and magnetic recording mediums are produced as samples, and they are mounted in the magnetic storage apparatus.

When a record is reproduced in a state in which the generation of unstable magnetic structure in the FGL is inhibited as in the related art as a comparative example, that is, the high-frequency oscillator is ordinarily operated for stable operation in this magnetic storage apparatus adopting the microwave assisted magnetic recording method, the elimination of information or a wrong record may be made in reproducing information or in seeking depending upon external environment though high recording density can be realized.

It is heretofore known that a stray magnetic field from the spindle motor and external equipment such as a personal computer is absorbed in the soft magnetic underlayer of the magnetic recording medium and concentrated on the magnetic recording pole, further, the magnetic field and a leakage magnetic field from an intricate recording pattern recorded in the magnetic recording medium are joined, resulting in the magnetic fields concentrated on the magnetic recording pole. Then, as in the present invention, the above-mentioned problem is also caused although structure in which a measure for a stray magnetic field is sufficiently taken by such the related art as disclosed in JP-A No. 2006-114159 is adopted and it is also verified in simulation that the structure has sufficient resistance to an external magnetic field, it has been thought that the above-mentioned problem is a problem proper to the microwave assisted recording method.

Figure 1C:
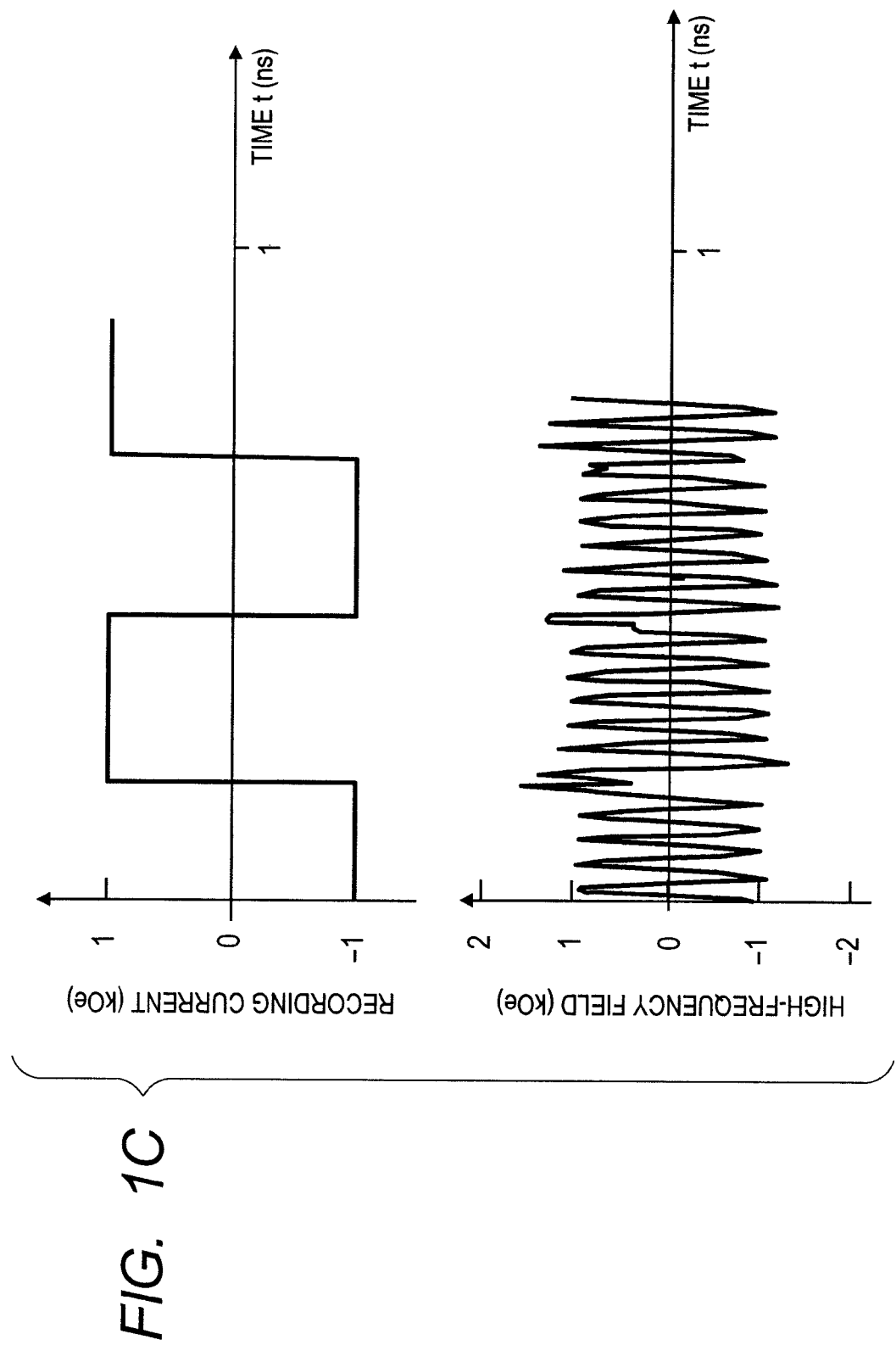
FIG. 1C shows one example of relation between magnetic head exciting current and a high-frequency field.

Then, the fundamental cause of this phenomenon is earnestly researched by means of both LLG simulation and experiments. As a result, it is clarified that a magnetic field induced by another mechanism is overlapped with the assist effect of the high-frequency oscillator in addition to a feeble magnetic field from the magnetic recording pole for which a measure is already taken in the related art and in reproducing information or in seeking, the elimination of information and a wrong record are also caused. In this case, the magnetic field induced by another mechanism means a magnetic field from a recording pattern of a type absorbed via the gap in the recording head part and intensified out of leakage magnetic fields of the magnetic recording medium and it is clarified that as the magnetic field had the same component as the oscillation control magnetic field 126 shown in FIG. 1, the magnetic field has an effect upon the FGL 141 and assist effect. That is, the high-frequency oscillator 140 inserted into the gap 125 is wrongly operated because of the magnetic field which should not originally exist in non-recording and assist effect is induced. This mechanism is a problem which does not come into question in the conventional type recording method at all and which is proper to this microwave assisted recording method in which the high-frequency oscillator 140 is provided in the magnetic gap 125, and it is clarified that the problem is an essential problem that cannot be avoided at a level of the part in the recording head part in which the magnetic recording pole 122 and the auxiliary magnetic pole 124 are formed by soft magnetic materials and which has the high potential of also absorbing a leakage magnetic field from the medium 130.

Then, first, technique for inhibiting assist effect when the storage is operated except recording operation has been earnestly researched at a level of the storage. After the storage shown in FIG. 2 is assembled with the magnetic head and the magnetic recording medium in this embodiment, the high-frequency oscillator is first operated at a predetermined current value in a predetermined area R of the magnetic recording medium, further, recording current is supplied to the coil of the main magnetic pole to energize the main magnetic pole, and a servo signal is recorded in the magnetic recording medium.

Figure 4:
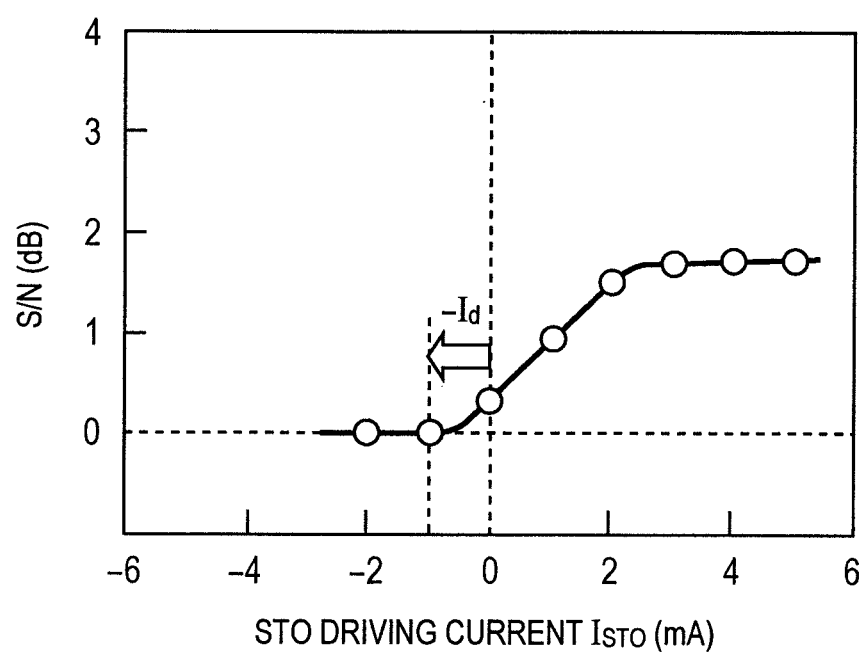
FIG. 4 shows an example of microwave assisted recording effect and assisted effect inhibition according to the present invention.

Next, FIG. 4 shows a result of energizing the coil 123 of the main magnetic pole 122 while driving the high-frequency oscillator with positive and negative current values $I_{STO}$ based upon the servo signal, recording a predetermined check signal and others and evaluating S/N at respective $I_{STO}$ when the check signal is reproduced. The S/N shown in FIG. 4 denotes a relative value. As a result, as shown in FIG. 4, it is clarified that as assist effect by the microwave assisted magnetic head is left depending upon recording current (an external recording magnetic field is supposed) to the main magnetic pole even if its driving current is turned zero (the high-frequency oscillator is not operated) in reproducing a signal, an effect is also left because of interaction between the recording magnetic field 121 and the FGL 141 when the magnetic storage apparatus is operated except in recording operation. However, it is clarified that the intensity is sufficiently small and can be practically ignored. More desirably, the assist effect can be completely inhibited by supplying current $-I_d$ of reverse polarity to the high-frequency oscillator immediately before a signal is reproduced (or immediately after the recording of a signal is finished) so as to cancel the effect. As a result of practically stopping the energization of the high-frequency oscillator 140 or supplying current $-I_d$ of reverse polarity to each area R and evaluating the magnetic storage apparatus by a predetermined number on the same condition as the condition in the comparative example in which the elimination of information and a wrong record are caused, it can be verified that a problem of the elimination of information or a wrong record and others is not observed at all in any case.

Then next, a method of reproducibly and stably converting a state of the high-frequency oscillator from the above-mentioned unoperated state to an operated state, extracting the highest performance of the head and the medium and reducing an effect of the manufacturing dispersion and the variation of environmental conditions has been earnestly researched using the head drive controller according to the present invention. To acquire efficient assist effect, it is important to stably oscillate the high-frequency oscillator and match a high-frequency field from the high-frequency oscillator and precession in the magnetic recording medium in a frequency and a phase.

However, their frequencies and phases also vary depending upon the dispersion of the manufacturing process, the dependence to temperature of a constant of material, the relative orientation and the intensity of an oscillation control magnetic field from the magnetic head like the stability of the magnetic domain structure of the FGL. As a result of earnest research by these inventors, it has been found out that magnetization spin in the FGL is made steady and can be stabilized by starting the energization required for operation for the exchange-coupled composite (ECC) medium of the high-frequency oscillator 140 in the unoperated state or to which current of reverse polarity is supplied before the energization of the magnetic recording pole in the microwave assisted recording head part at least by 0.1 ns or more, more desirably by 1 ns or more and suitably adjusting timing for the start of the supply of recording current according to the magnetic recording medium and external environment, further, optimum assist effect for the magnetic recording medium can be acquired and as a result, an error rate can always be stably kept. Since a recording magnetic field is normally delayed by approximately 0.2 to 0.5 ns for recording current, the adjustment of timing for turning off STO driving current is also important so as to suitably cope with the delay.

As a result of detailed research in LLG simulation and others, it is clarified that this effect is acquired on the following conditions.

(1) Current flows regularly and stably in the size of a few tens nm, in addition, approximately 0.1 to 1 ns is required to stabilize the oscillation of the high-frequency oscillator after a magnetic field is applied, and considering the timing of phase matching, it is effective to control the timing after time to spare equivalent to approximately its 5%.

(2) In the magnetic storage apparatus in which a damping constant α and others of the high-frequency oscillator 140 and the magnetic recording medium 130 are suitably set, their magnetization spin frequencies vary over time, phase matching is made easier, and more efficient assist effect can be realized by suitable tuning.

(3) Further, when the auxiliary magnetic pole 124 is provided and a high-frequency field is applied while applying a recording magnetic field provided with an in-plane magnetic field component to the magnetic recording medium, dipole interaction in magnetization in a crystal grain effectively acts especially in the ECC type medium so that phases of the precession of magnetization in respective crystal grains of the medium are matched.

That is, it is verified that a state of the high-frequency oscillator 140 can be reproducibly converted stably from an unoperated state to an operated state by adjusting the appropriate timing of turning on or off STO driving current for recording current at the level of the magnetic storage apparatus using the head drive controller and the control method according to the present invention, and that the probability of the synchronization of a high-frequency field and the precession of the magnetization of a group of crystal grains in a magnetization inversion area in which a recording bit of the medium is determined can be enhanced and desired high assist effect can be acquired.

(Procedure of Storage Apparatus Adjustment)

Figure 5:
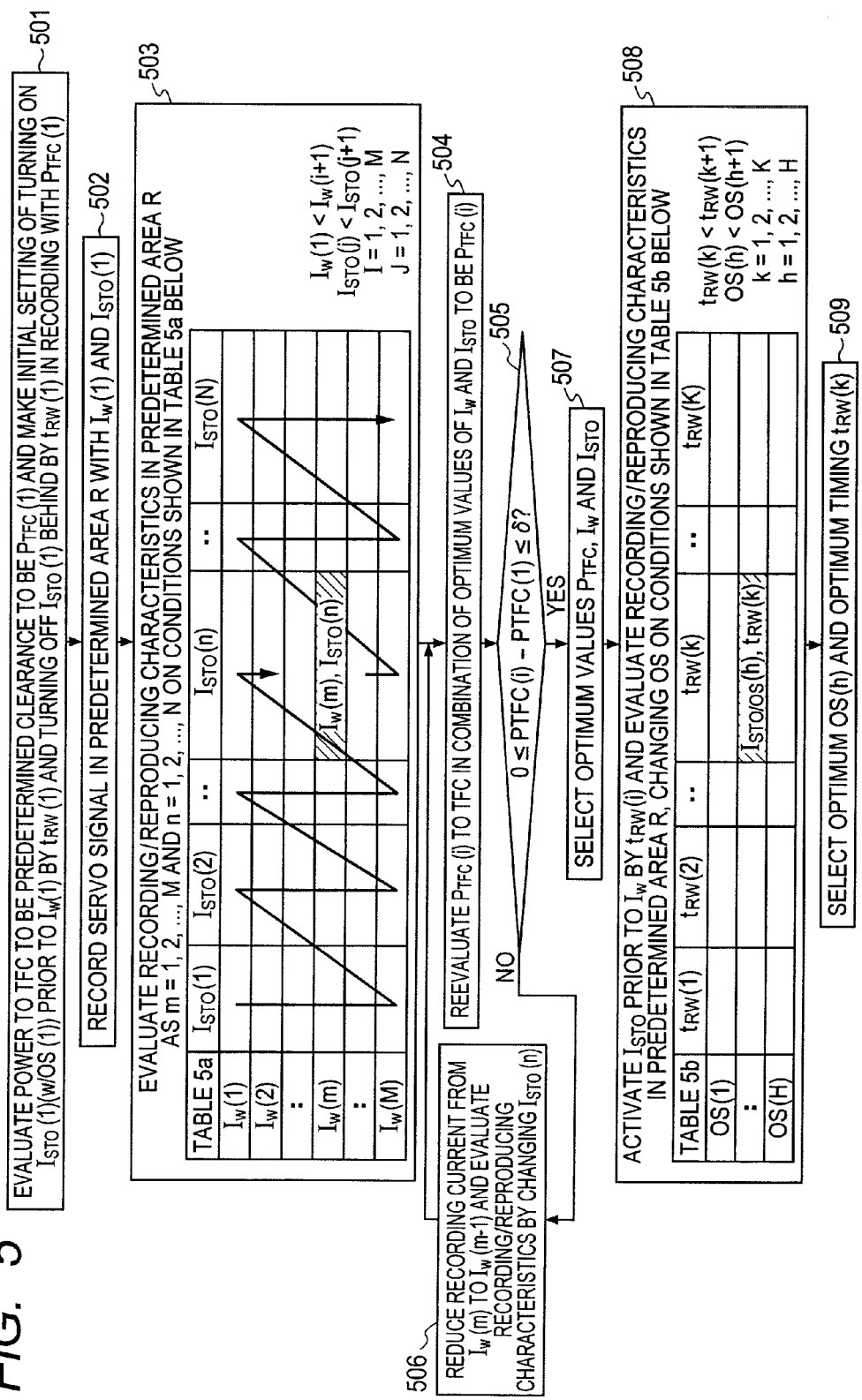
FIG. 5 is an example of a flowchart showing parameter control according to the present invention.

FIG. 5 is a flowchart showing the adjustment of the magnetic storage apparatus by the head drive controller according to the present invention invented based upon the above-mentioned knowledge.

In the head drive controller in this embodiment, the energizing timing of the high-frequency oscillator 140, a current waveform and a current value of the drive, clearance control power and recording current to the magnetic recording pole are simultaneously set (501). After the magnetic storage apparatus shown in FIG. 2 is assembled using this head drive controller, the four magnetic heads and the two magnetic recording mediums, power input to the thermal flying height controller TFC 102 is adjusted ($P_{TFC}$ (1)) so that the high-frequency oscillator is first secured apart from the magnetic recording medium by predetermined clearance in a predetermined area of the magnetic recording medium. This is, for example, performed by sequentially inputting power to the thermal flying height controller TFC 102 and reducing power equivalent to predetermined clearance from input power at the time of detecting touch with the magnetic recording medium 130. Relation among clearance, an amount of thermal expansion and electric energy input to the TFC shall be clarified beforehand. The timing $t_{RW}$ (1), $t_{RWB}$ (1) of turning on or off STO driving current for recording current, a current waveform (overshoot (OS))(1) and others are also preliminarily evaluated beforehand, and optimum values are determined.

Figure 6:
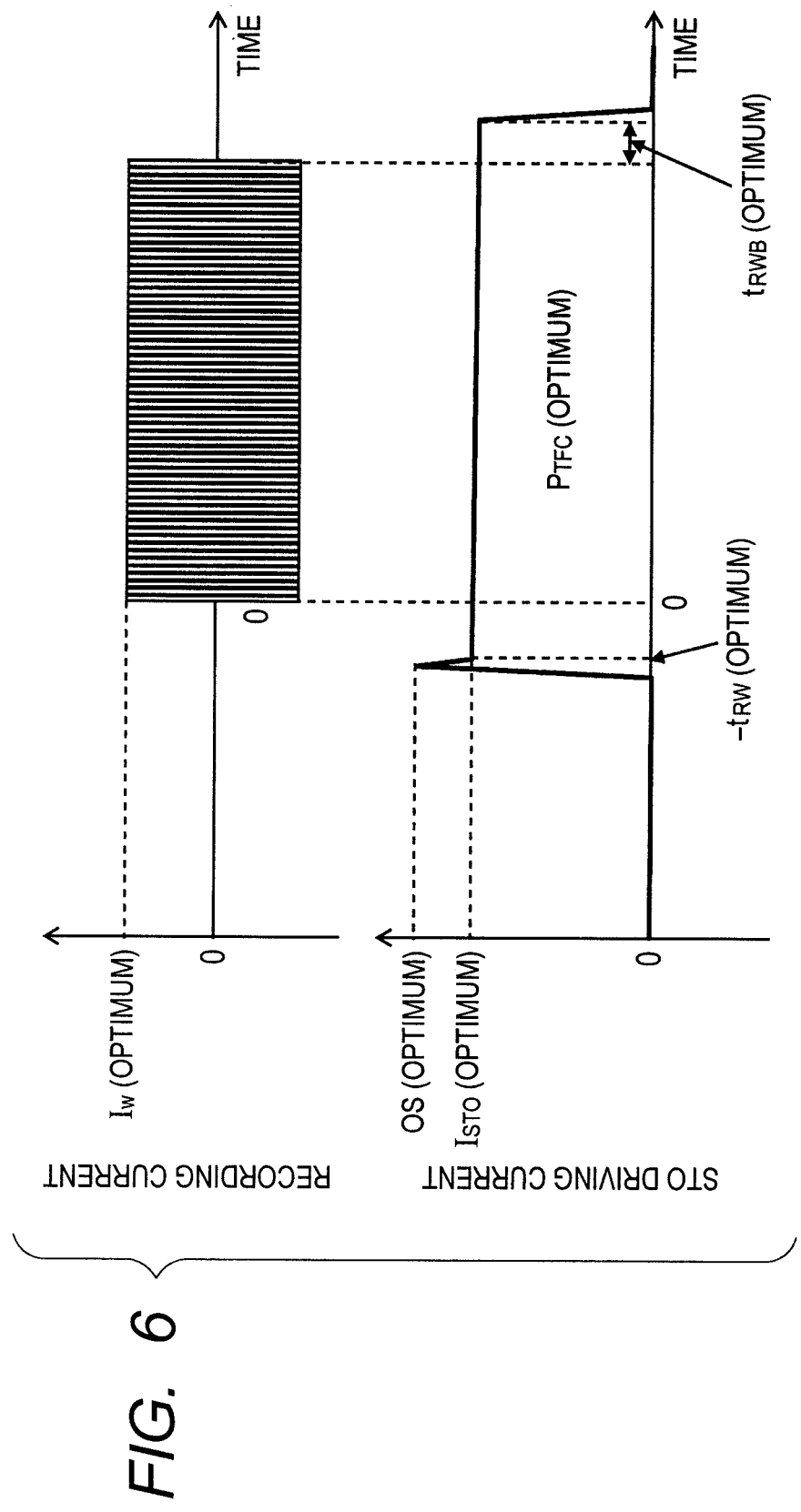
FIG. 6 is an example of a conceptual drawing showing the parameter control determined by an embodiment shown in FIG. 5 of the present invention.

Next, as shown in FIG. 6, the high-frequency oscillator 140 is operated at a predetermined current value $I_{STO}$ (1) at the predetermined timing $t_{RW}$ (1), $t_{RWB}$ (1) at the current waveform (the overshoot (OS)) (1), then the magnetic recording pole 122 is energized and excited with recording current $I_W$ (1), and a servo signal is recorded in the predetermined area of the magnetic recording medium 130 (502). The overshoot (OS) is a current waveform for the initial acceleration of the precession of spin.

Next, a predetermined check signal is recorded and reproduced in the predetermined area based upon the servo signal in each combination of $I_W$(m) and $I_{STO}$(n) shown in a table 5a in FIG. 5 (503). These values are stored in a register as a table for controlling parameters. In this case, a process that $I_W$ is varied with a current value $I_{STO}$ fixed and the coil 123 of the main magnetic pole 122 is energized is executed and further, the process is repeated while varying the current value $I_{STO}$. Recording/reproducing characteristics such as a bit error rate, overwrite, regenerative output and an adjacent track interference (ATI) characteristic in respective combinations are measured and the optimum combination of $I_W$(m) and $I_{STO}$ (n) in which the highest characteristic is acquired is determined.

Next, in this state, power $P_{TFC}$ input to the thermal flying height controller TFC and the clearance are measured again (504). When the clearance is smaller than the predetermined value (the input power $P_{TFC}$ (i) is not less than the predetermined value)(505), the driving current to the high-frequency oscillator 140 is optimized while reducing recording current $I_W$ by one level and measuring recording/reproducing characteristics (506). It is evaluated whether the clearance is the predetermined value or not again. The process is repeated until the clearance is the predetermined value or less and the final optimum values of $I_W$, $I_{STO}$ and $P_{TFC}$ are determined (507). In this case, according to a recording pattern, the precompensation (so-called write pre-compensation) of recording current $I_W$ timing is also automatically executed.

When overshoot (OS) is high, there is a tendency that timing $t_{RW}$ and its dispersion can be almost dispensed with. However, since the operation is not stable when overshoot is too high, it is desirable that the overshoot is adjusted. Then, finally, to stabilize the current distribution and an oscillated state of the high-frequency oscillator 140, a current waveform OS to the high-frequency oscillator and the energizing timing $t_{RW}$ are varied as in combinations shown in a table 5b in FIG. 5, recording/reproducing characteristics such as a bit error rate, overwrite, reproduced output and an adjacent track interference (ATI) characteristic are similarly measured (508), and the optimum combination of OS (h) and $t_{RW}$(k) in which the highest characteristic is acquired is determined (509). Though it is omitted in FIG. 5, timing $t_{RWB}$ (k) to disconnect STO driving current is also adjusted in the same way as the setting of $t_{RW}$ (k) as shown in FIG. 6. The above-mentioned optimum values are stored in a register of the head drive controller as a table for parameter control and are used for controlling the operation of the magnetic storage apparatus.

FIG. 6 is an operational conceptual drawing showing recording current and high-frequency oscillator driving current respectively optimized according to the flowchart in this embodiment. FIG. 6 compares the timing of respective starts of the supply of recording current $I_W$ and a current value $I_{STO}$. The supply of a current value $I_{STO}$ to the high-frequency oscillator 140 is started prior to the start of the supply of recording current $I_W$ by energizing timing $t_{RW}$. The energizing timing $t_{RW}$ is required time to stabilize current distribution in the oscillator, an oscillated state, recording and others since current (the current value $I_{STO}$) is supplied to the high-frequency oscillator 140.

In the magnetic storage apparatus such as a hard disk drive (HDD), the switching time of recording and reproduction is approximately 50 ns. In this embodiment, respective activating timing is adjusted by setting so that the switching is completed in this time and further, the activation completion time of a high-frequency oscillator driving circuit comes prior to switching time from reproduction to recording in a recording head driving circuit at least by 0.1 ns or more. The rising time of the respective circuits is approximately 10 ns.

In this embodiment, in the combinations shown in the embodiments 1a, 1b, 1c in FIG. 3, it is verified that respective recording density is 1.2 Tb/in$^2$, 1.6 Tb/in$^2$, 2.0 Tb/in$^2$ at the manufacturing yield equivalent to that in the related art and double or triple recording density of the recording density in the related art can be achieved. Further, it is verified that proof stress to an external magnetic field is also similar to that in the conventional type or more. In addition, even if energizing timing $t_{RW}$ is zero, the similar effect is acquired.

Second Embodiment

Figure 7:
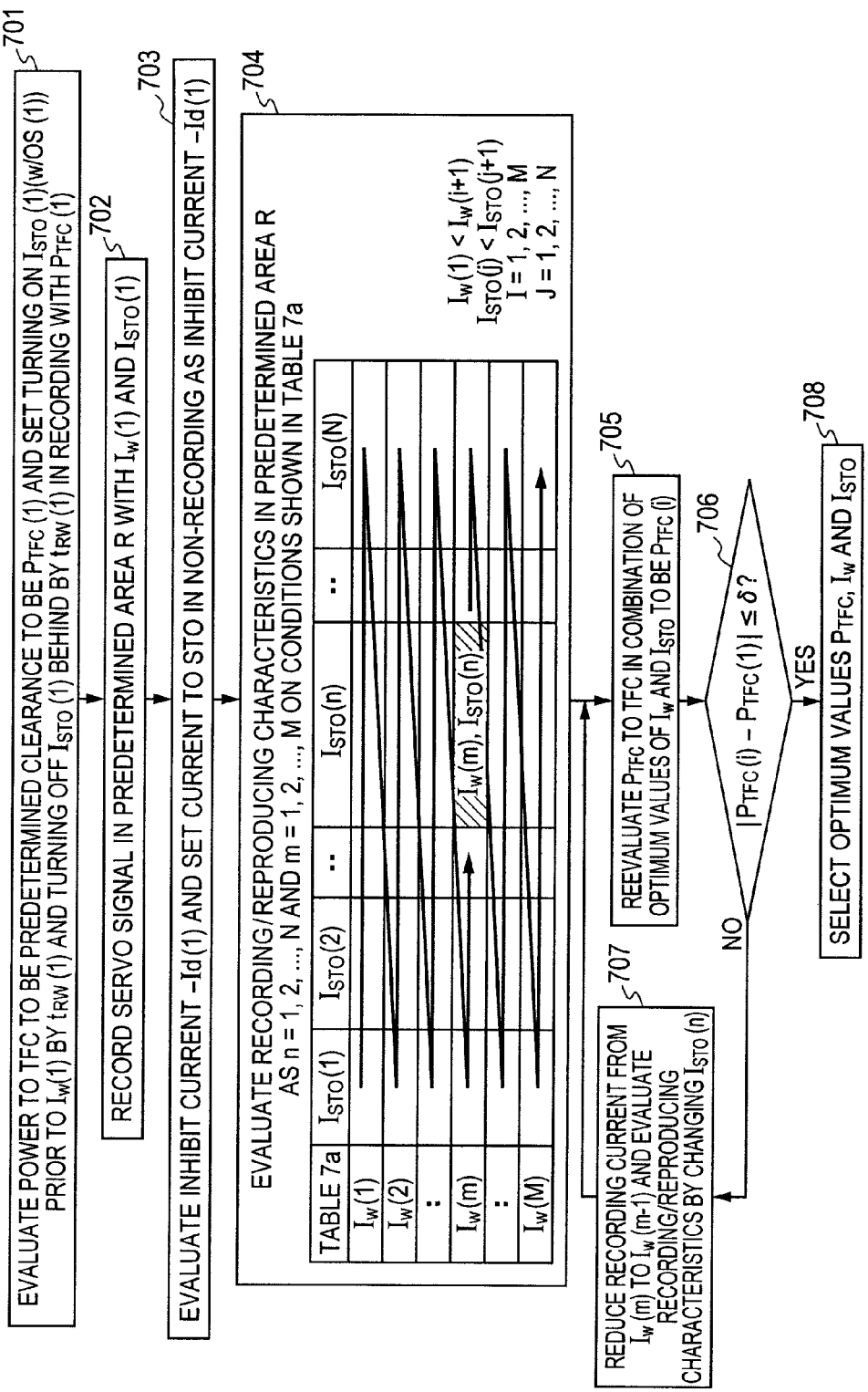
FIG. 7 is an example of another flowchart showing parameter control according to the present invention.

FIG. 7 shows an especially effective embodiment in a case that recording density is higher and proof stress to an external magnetic field is more feared.

First, after the magnetic storage apparatus shown in FIG. 2 is assembled using the head drive controller, the six magnetic heads and the three magnetic recording media respectively described in the first embodiment, power input to a thermal flying height controller TFC is first adjusted ($P_{TFC}$ (1)) in a predetermined area of the magnetic recording medium to secure predetermined clearance between a high-frequency oscillator and the magnetic recording medium as in the first embodiment (701). Next, the high-frequency oscillator is operated at a predetermined current value $I_{STO}$ (1) and a predetermined current waveform OS (1), further, recording current $I_W$ (1) is supplied to a magnetic recording pole to energize it, and a servo signal is recorded in the magnetic recording medium 130 (702). In this case, to stabilize current distribution and an oscillational state in the storage so as to acquire stable recording, a stable current portion of $I_{STO}$ (1) is supplied prior to a start of the supply of $I_W$ (1) by $t_{RW}$ (1) which is a mean value acquired in a prior experiment and considering that a recording magnetic field is delayed by approximately 0.2 to 0.5 ns from recording current, the supply is finished behind by $t_{RWB}$ (1). Since the $t_{RW}$ varies depending upon temperature and the $t_{RWB}$ varies depending upon a recording frequency and temperature, respective optimization is required.

Next, the main magnetic pole 122 is energized, supplying positive and negative current (values) $I_{STO}$ to the high-frequency oscillator 140, a predetermined check signal is recorded based upon the servo signal while energizing the high frequency oscillator with positive and negative current values $I_{sto}$, S/N at respective $I_{STO}$ is evaluated as shown in FIG. 4, and assist effect inhibition current $-I_d$ of the high-frequency oscillator 140 is determined (703). These values are stored in a register of the head drive controller as a table for parameter control.

Next, the high-frequency oscillator 140 is operated at the predetermined current value $I_{STO}$ (1) and the overshoot OS (1), the recording current $I_W$ (1) is supplied to the magnetic recording pole to energize it, a servo signal is recorded in the predetermined area of the magnetic recording medium 130, and next, the predetermined check signal is recorded and reproduced based upon the servo signal in the predetermined area in each combination shown in a table 7a in FIG. 7 of $I_W$ (m) and $I_{STO}$ (n) (704). In this case, a process for recording with $I_W$ fixed and with $I_{STO}$ varied is executed and further, the process is repeated, varying recording current $I_W$.

Recording/reproducing characteristics such as a bit error rate, overwrite, regenerative output and an adjacent track interference (ATI) characteristic in respective combinations are measured and the optimum combination of $I_W$ (m) and $I_{STO}$ (n) in which the highest characteristic is acquired is determined (705). Even if the variable order of $I_W$ and $I_{STO}$ is made reverse to the above-mentioned order, the optimum combination can be similarly determined.

Next, in this state, power $P_{TFC}$ input to the thermal flying height controller and clearance are measured again. When the difference (an absolute value of difference in the input power $P_{TFC}$) between the value of the clearance and a predetermined value increases (706), a driving current to the high-frequency oscillator is optimized while measuring recording/reproducing characteristics by reducing recording current $I_W$ by one level (707), and it is evaluated whether the clearance is the predetermined value or not again. The process is repeated until the clearance is the predetermined value or less and final optimum values of $I_W$, $I_{STO}$ and $P_{TFC}$ are determined (708). These optimum values are stored in a register of the head drive controller as a table for parameter control and are used for the control of the head drive controller. In this case, the pre-compensation (so-called write pre-compensation) of the timing of recording current $I_W$ for a special recording pattern is also automatically made.

Figure 8:
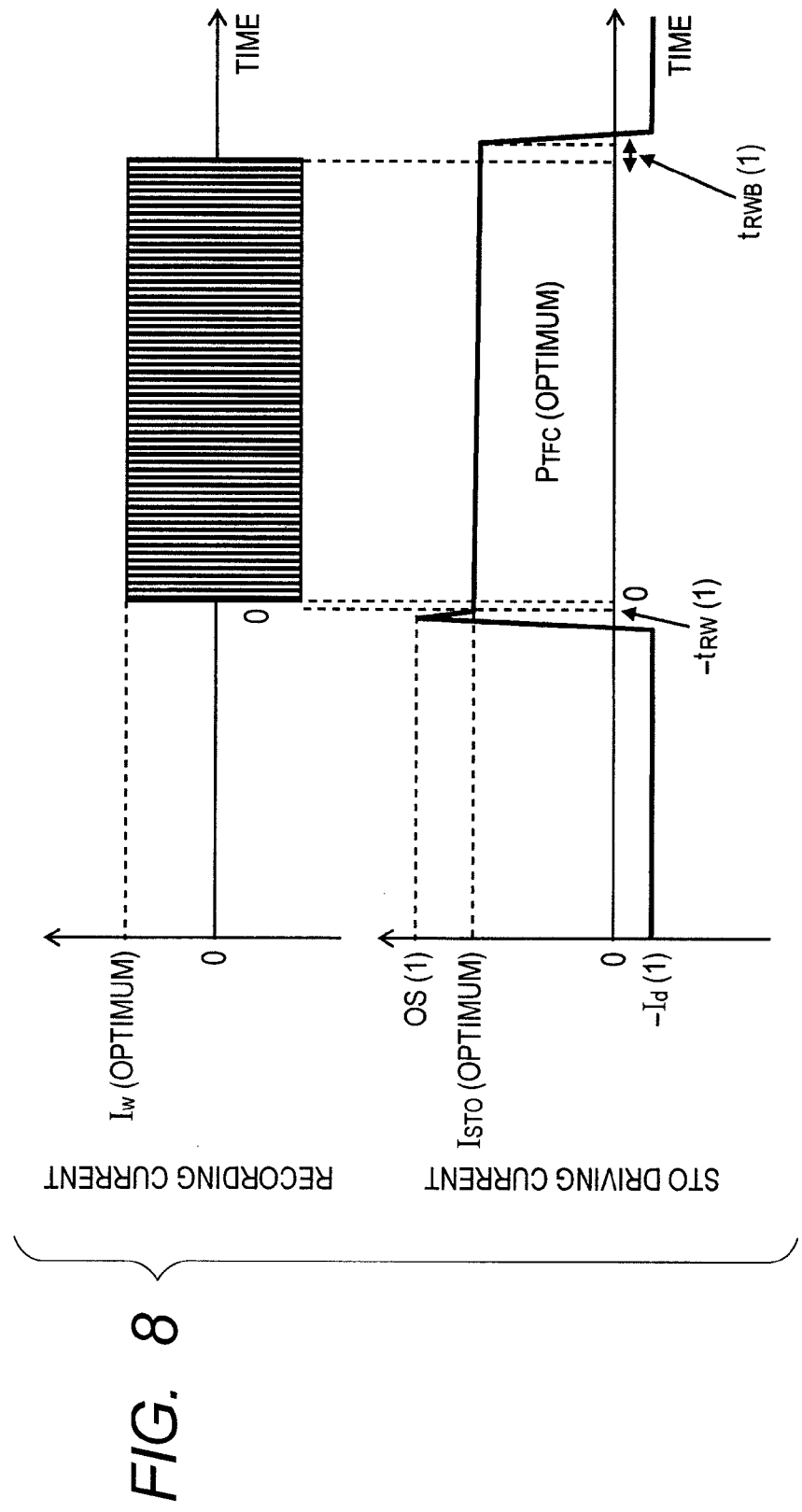
FIG. 8 is an example of a conceptual drawing showing the parameter control determined by an embodiment shown in FIG. 7 of the present invention.

FIG. 8 is an operational conceptual drawing showing recording current and high-frequency oscillator driving current respectively optimized according to a flowchart in this embodiment. In this embodiment, it is verified that the similar manufacturing yield and the similar recording density to those in the first embodiment are achieved and further, proof stress to an external magnetic field is improved to 1.5 times that in the first embodiment or more. As in the first embodiment, as a result of optimizing energizing timing $t_{RW}$, disconnecting timing $t_{RWB}$, assist effect inhibition current $I_d$ and the overshoot OS, high reliability without an error in reproduction of approximately twice higher reliability in the first embodiment for the variation of external environment is acquired, which is especially preferable.

Third Embodiment

For a third embodiment, an example of the highest system in cost performance will be described below.

First, the magnetic storage apparatus shown in FIG. 2 is assembled using the head drive controller described in the first embodiment, one magnetic head and one magnetic recording medium. Then, power input to a thermal flying height controller is adjusted ($P_{TFC}$ (1)) to secure predetermined clearance between a high-frequency oscillator 140 and the magnetic recording medium 130 in a predetermined area of the magnetic recording medium 130 as in the first embodiment (501). Next, the high-frequency oscillator 140 is operated at a predetermined current value $I_{STO}$ (1), recording current $I_W$(1) is supplied to a coil 123 of a magnetic recording pole 122 to energize it, and a servo signal is recorded in the magnetic recording medium (502). In this embodiment, an overshoot function and a reverse polarity-current supply function are not provided to a high-frequency oscillator driving circuit. When $I_{STO}$ (1) is supplied, the input of a stable current portion is started prior to the timing of the supply of $I_W$ (1) by $t_{RW}$(1) as in other embodiments and the supply of the stable current portion is finished behind by $t_{RWB}$ (1).

Next, as in the flow in FIG. 7, the high-frequency oscillator 140 is operated at a predetermined current value $I_{STO}$ (1), further, recording current $I_W$(1) is supplied to the coil 123 of the magnetic recording pole 122 to energize it, a servo signal is recorded in the predetermined area of the magnetic recording medium 130, and next, a predetermined check signal is recorded and reproduced in the predetermined area based upon the servo signal in each combination of $I_W$(m) and $I_{STO}$ (n) described in the table shown in FIG. 7 (704). In this case, a process for recording with $I_W$ fixed and with $I_{STO}$ varied is executed and further, the process is repeated while varying recording current $I_W$. Recording/reproducing characteristics such as a bit error rate, overwrite, reproduced output and an adjacent track interference (ATI) characteristic in respective combinations are measured and the optimum combination of $I_W$ (m) and $I_{STO}$ (n) in which the highest characteristic is acquired is determined (705). Even if the variable order of $I_W$ and $I_{STO}$ is reversed, the optimum combination can be similarly determined.

Next, in this state, power $P_{TFC}$ input to the thermal flying height controller and clearance are measured again. When the difference in clearance between the value and a predetermined value (an absolute value of the difference of the input power $P_{TFC}$) increases (706), a driving current to the high-frequency oscillator 140 is optimized while measuring recording/reproducing characteristics by reducing recording current $I_W$ by one level (707) and it is evaluated whether the clearance is the predetermined value or not again. The process is repeated until the clearance is the predetermined value or less and final optimum values of $I_W$, $I_{STO}$, $P_{TFC}$ are determined (708). These optimum values are stored in a register of the head drive controller as a table for parameter control and are used for controlling the head drive controller. In this case, according to a recording pattern, the pre-compensation (so-called write pre-compensation) of the supply timing of recording current $I_W$ to a special recording pattern is also automatically made.

Figure 9:
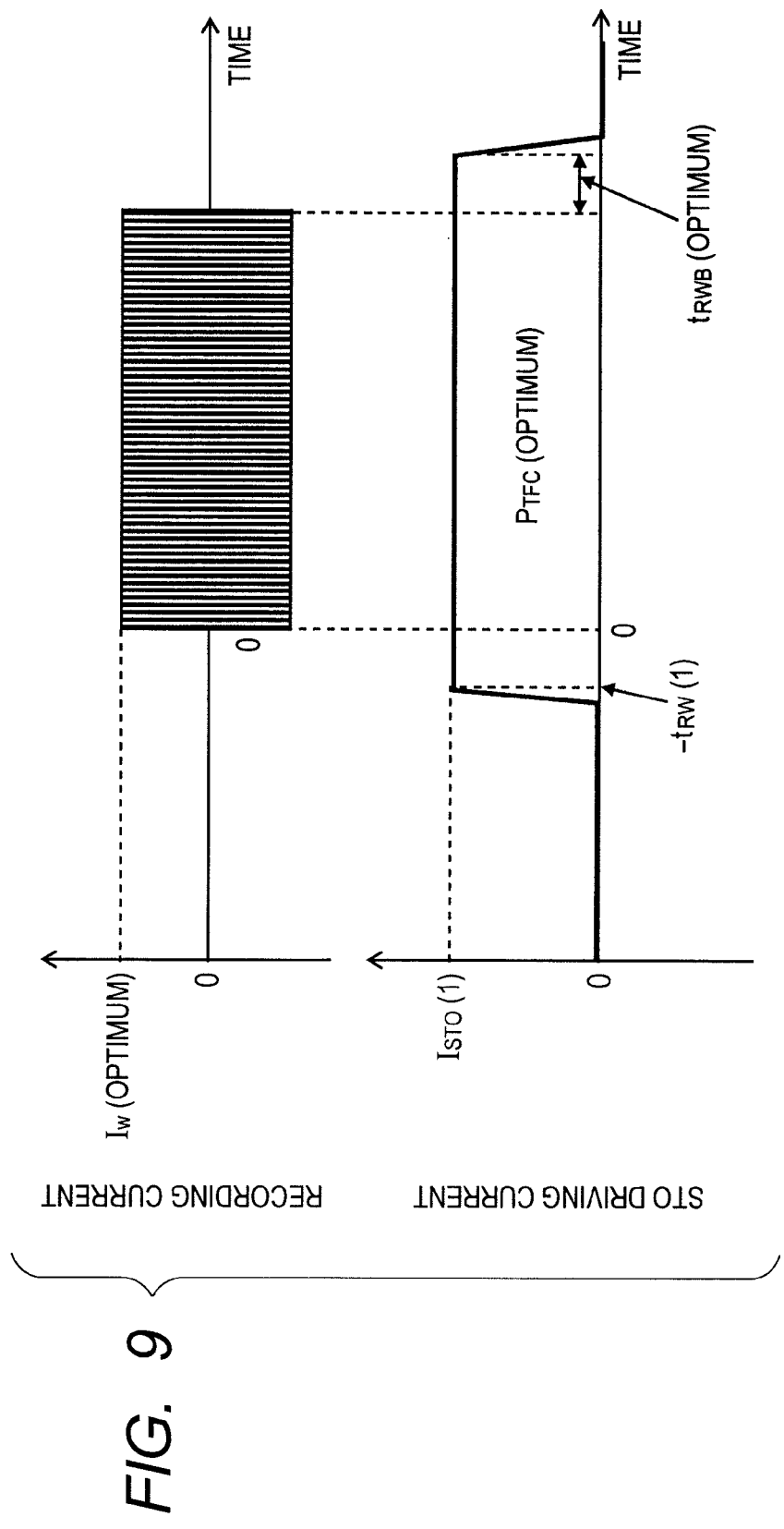
FIG. 9 is an example of another conceptual drawing showing parameter control determined by the present invention.

FIG. 9 is an operational conceptual drawing showing recording current and high-frequency oscillator driving current respectively optimized according to the flowchart in this embodiment. In this embodiment, a manufacturing yield and recording density are a few percent inferior to those in the first embodiment. However, it is verified that the magnetic storage apparatus in which an external magnetic field proof stress characteristic is similar and a recording density characteristic is overwhelmingly better, compared with the related art is realized. In addition, as a result of optimizing energizing timing $t_{RW}$ and disconnecting timing $t_{RWB}$ as in the first embodiment, the yield is improved up to the similar manufacturing yield to that in the first embodiment, which is preferable.

Fourth Embodiment

In this embodiment, an example of a magnetic storage apparatus provided with excellent characteristics not only indoors but in the whole range of the assurance temperature of the magnetic storage apparatus will be described.

FIG. 10 shows a flow for setting current operation timing in a high-frequency oscillator 140 based upon time at which the supply of recording current is started according to the present invention even if environment where the magnetic storage apparatus is operated varies using timing $t_{RW}$ at which the operation is turned on for an example. The magnetic storage apparatus in this embodiment is assembled as in the first, second and third embodiments. For added functions, the magnetic storage apparatus is provided with external environment detecting function and a correcting function for readjusting each parameter in the process shown in FIG. 5 or 7 based upon the information of the detection of external environment. The correcting function for readjusting the operating timing $t_{RW}$ of recording current and the high-frequency oscillator based upon the external environment detecting function and detected information will be described below. In the following description, for external environment, temperature is detected.

First, the whole temperature range is divided into regions of "Q+1" (Q: 0, 1, 2, . . . ) depending upon the boundary temperature of $T_1$, $T_2$, . . . , $T_p$. When Q=0, no division is made. Each temperature region $T \le T_1$, . . . , $T_{q-} < T \le T_q$ . . . , $T_Q < T$ is defined as each temperature condition A [1], . . . , A [q], . . . , A [Q+1].

Next, timing for turning on and off the operation of the high-frequency oscillator 140 is determined according to the flow shown in FIG. 5 and others in a manufacturing process of the magnetic storage apparatus and set to the values $t_{RW}$ (IN) and $t_{RWB}$ (IN). Further, appropriate representative points in the temperature range are determined in its manufacturing and inspection processes, optimum parameters at their representative temperature are acquired beforehand according to the flown shown in FIG. 5 and others and are stored in a register of a head drive controller (1001), and they are used for the control of the magnetic storage apparatus.

Figure 11:
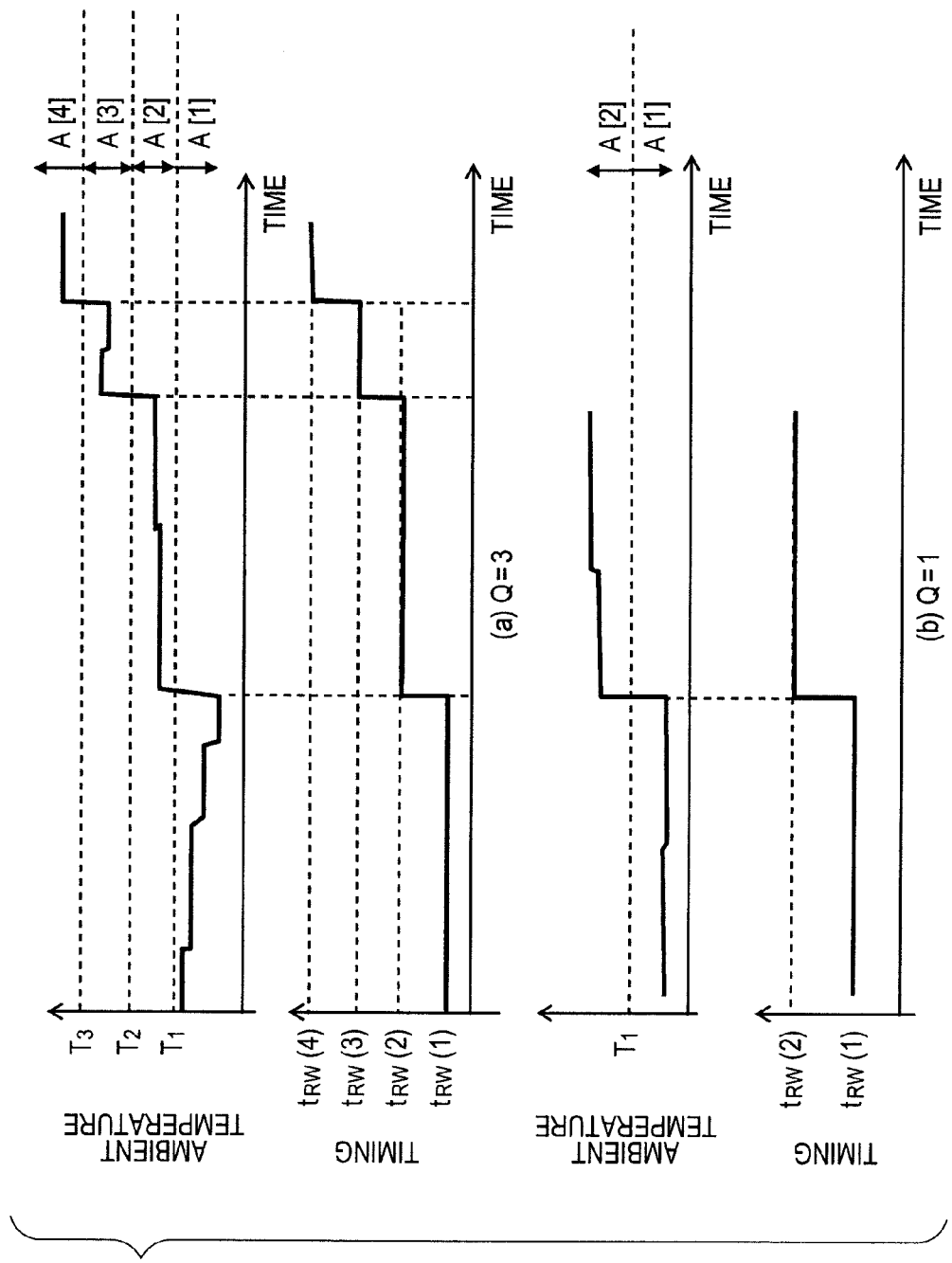
FIG. 11 is an example of a conceptual drawing showing the setting of the timing determined by an embodiment shown in FIG. 10 of the present invention.

Next, when ambient temperature varies in actual operational environment in a field and ambient temperature T encircling a magnetic recording head and a magnetic recording medium in the magnetic storage apparatus is a temperature condition A [q] (1003 to 1006), the timing for operating the high-frequency oscillator 140 is varied to energizing timing $t_{RW}$(q) corresponding to each temperature condition (1007 to 1010), and recording and reproduction are performed. The same goes for timing $t_{RWB}$ (q) for turning off the operation of the high-frequency oscillator. In FIGS. 11A and 11B, examples when Q=3, 1 in the embodiment shown in FIG. 10 are shown in relation to timing $t_{RW}$ (q) for turning on the operation of the high-frequency oscillator. The same goes for timing $t_{RWB}$ (q) for turning off the operation of the high-frequency oscillator. As shown in FIG. 8, as the reliability is further enhanced when inhibit current is set in reproducing operation, it is especially preferable.

In the above-mentioned first, second and third embodiments, the configuration of the present invention has been described using the variation of temperature for the examples. It goes without saying that the magnetic storage apparatus provided with even better characteristics in operation assurance environment can be provided by determining optimum parameters according to a pressure change that has an effect upon clearance and adjusting so that magnetic recording is made with the parameters according to ambient temperature.

Further, in the above-mentioned embodiments, the cases that the high-frequency oscillator 140 is located in the gap between the magnetic recording pole 122 and the auxiliary magnetic pole 124 have been described. However, if only the high-frequency oscillator 140 is located in the vicinity of the magnetic recording pole 122, it is not required to be located in the gap. Although the configuration of the present invention has been described using the magnetic disk drive (HDD) for the example, the configuration of the present invention can also be applied to another magnetic storage apparatus such as a magnetic tape drive.

What is claimed is:

1. A method of determining parameters for controlling a magnetic storage apparatus provided with a magnetic recording medium, a microwave assisted magnetic recording head at least equipped with a magnetic recording pole that generates a recording magnetic field for writing to the magnetic recording medium and a high-frequency oscillator that generates a high-frequency field, a magnetic reproducing head that reads information from the magnetic recording medium, a unit that controls and processes the recording operation of the magnetic recording head and the reproducing operation of the magnetic reproducing head and a clearance control unit that controls clearance between the high-frequency oscillator and the magnetic recording medium in a manufacturing process of the magnetic storage apparatus, comprising first, second and third steps of:

determining a combination of first and second current values in which a high recording/reproducing characteristic is acquired by varying the combination of the value of first current for generating the magnetic recording field and the value of second current for generating the high-frequency field and recording/reproducing in/from the magnetic recording medium;

determining the combination of the first and second current values in which the high recording/reproducing characteristic is acquired by varying the first and second current values determined in the first step while varying the clearance until the clearance is a predetermined value by the clearance control unit as well as by recording/reproducing in/from the magnetic recording medium; and determining a combination of a current waveform and the timing of supply in which the high recording/reproducing characteristic is acquired by varying the waveform of the second current and the timing of the supply in recording/reproducing in/from the magnetic recording medium at the first and second current values determined in the second step.

2. A method of determining parameters for controlling a magnetic storage apparatus provided with a magnetic recording medium, a microwave assisted magnetic recording head at least equipped with a magnetic recording pole that generates a magnetic recording field for writing to the magnetic recording medium and a high-frequency oscillator that generates a high-frequency field, a magnetic reproducing head that reads information from the magnetic recording medium, a unit that controls and processes the recording operation of the magnetic recording head and the reproducing operation of the magnetic reproducing head and a clearance control unit that controls clearance between the high-frequency oscillator and the magnetic recording medium in a manufacturing process of the magnetic storage apparatus, comprising first, second and third steps of:

determining a value of assist effect inhibition current by which a high recording/reproducing characteristic is acquired and which is supplied in non-recording by recording/reproducing in/from the magnetic recording medium at a predetermined value of first current for generating the recording magnetic field and a predetermined value of second current for generating the high-frequency field;

determining a combination of the first and second current values in which the high recording/reproducing characteristic is acquired by varying the combination of the first current value and the second current value and recording/reproducing in/from the magnetic recording medium; and determining the combination of the first and second current values in which the high recording/reproducing characteristic is acquired by varying the first and second current values determined in the first step while varying the clearance until the clearance is a predetermined value by the clearance control unit as well as by recording/reproducing in/from the magnetic recording medium.

3. The method of determining parameters for controlling the magnetic storage apparatus according to claim 1, wherein the timing in the supply includes a timing for starting the supply of the second current prior to a start of the supply of the first current and a timing for stopping the supply of the second current after the stop of the supply of the first current.

4. The method of determining parameters for controlling the magnetic storage apparatus according to claim 3, wherein at least one of the timing of the supply and the timing of the stop of the supply is determined according to ambient temperature.

5. A magnetic storage apparatus provided with a magnetic recording medium, a microwave assisted magnetic recording head equipped with a magnetic recording pole that generates a magnetic recording field for writing to the magnetic recording medium and a high-frequency oscillator that generates a high-frequency field and a unit that energizes the high-frequency oscillator, a magnetic reproducing head that reads information from the magnetic recording medium, a unit that controls and processes the recording operation of the magnetic recording head and the reproducing operation of the magnetic reproducing head, wherein at a time of non-recording before starting to energize the magnetic recording pole, the high-frequency oscillator is energized by the unit that energizes the high-frequency oscillator, after that, the magnetic recording pole is energized and starts recording operation.

6. A magnetic storage apparatus provided with a magnetic recording medium, a microwave assisted magnetic recording head equipped with a magnetic recording pole that generates a magnetic recording field for writing to the magnetic recording medium and a high-frequency oscillator that generates a high-frequency field and a unit that energizes the high-frequency oscillator, a magnetic reproducing head that reads information from the magnetic recording medium, a unit that controls and processes the recording operation of the magnetic recording head and the reproducing operation of the magnetic reproducing head, wherein at a time of recording operation, the supply of current of single value to the high-frequency oscillator by the unit that energizes the high-frequency oscillator is started prior to the start of the supply to the magnetic recording pole by predetermined time.

7. The magnetic storage apparatus according to claim 5, wherein at a time of seeking, the supply of current to the high-frequency oscillator is stopped.

8. The magnetic storage apparatus according to claim 5, wherein the microwave assisted magnetic recording head is provided with the magnetic recording pole and an auxiliary magnetic pole; and the high-frequency oscillator is provided in a gap between these magnetic poles.

9. The magnetic storage apparatus according to claim 5, wherein the timing of energizing the high-frequency oscillator and the timing of the energizing the magnetic recording pole adjusted for optimizing a recording/reproducing characteristic of the magnetic storage apparatus are stored in a register that is used to control the operation of the magnetic storage apparatus.

10. The magnetic storage apparatus according to claim 5 further comprising a unit that controls clearance between the high-frequency oscillator and the magnetic recording medium,
wherein clearance values adjusted for optimizing a recording/reproducing characteristic of the magnetic storage apparatus are stored in a register.

11. The magnetic storage apparatus according to claim 5, wherein when the environment of the magnetic storage apparatus varies, the timing of energizing the high-frequency oscillator is readjusted.

12. The magnetic storage apparatus according to claim 10, wherein the recording/reproducing characteristic is reproduced output or an error rate.

13. The magnetic storage apparatus according to claim 11, wherein the variation of the environment of the magnetic storage apparatus is at least one of the variation of temperature or a pressure change.

14. The magnetic storage apparatus according to claim 6, wherein the predetermined time is more than 1 nanosecond.

15. The magnetic storage apparatus according to claim 5, wherein the magnetic recording medium is a patterned medium.

16. A magnetic storage apparatus provided with a magnetic recording medium, a microwave assisted magnetic recording head equipped with a magnetic recording pole that generates a magnetic recording field for writing to the magnetic recording medium and a high-frequency oscillator that generates a high-frequency field and a unit that energizes the high-frequency oscillator, a magnetic reproducing head that reads information from the magnetic recording medium, a unit that controls and processes the recording operation of the magnetic recording head and the reproducing operation of the magnetic reproducing head,
wherein at a time of recording operation to the magnetic recording medium, the high-frequency oscillator is energized by the unit that energizes the high-frequency oscillator, and
at a time of immediately before reproducing from the magnetic recording medium, the unit that energizes the high-frequency oscillator supplies current of reverse polarity of the recording operation to the high-frequency oscillator.

17. A magnetic storage apparatus provided with a magnetic recording medium, a microwave assisted magnetic recording head equipped with a magnetic recording pole that generates a magnetic recording field for writing to the magnetic recording medium and a high-frequency oscillator that generates a high-frequency field and a unit that energizes the high-frequency oscillator, a magnetic reproducing head that reads information from the magnetic recording medium, a unit that controls and processes the recording operation of the magnetic recording head and the reproducing operation of the magnetic reproducing head,
wherein at a time of recording operation to the magnetic recording medium, the high-frequency oscillator is energized by the unit that energizes the high-frequency oscillator, and
at a time of immediately after recording, the unit that energizes the high-frequency oscillator supplies current of reverse polarity of the recording operation to the high-frequency oscillator.

18. The magnetic storage apparatus according to claim 17, wherein the microwave assisted magnetic recording head is provided with the magnetic recording pole and an auxiliary magnetic pole; and
the high-frequency oscillator is provided in a gap between these magnetic poles.

19. The magnetic storage apparatus according to claim 17, wherein the timing of energizing the high-frequency oscillator and the timing of energizing the magnetic recording pole adjusted for optimizing a recording/reproducing characteristic of the magnetic storage apparatus are stored in a register that is used to control the operation of the magnetic storage apparatus.

20. The magnetic storage apparatus according to claim 17 further comprising a unit that controls clearance between the high-frequency oscillator and the magnetic recording medium,
wherein clearance values adjusted for optimizing a recording/reproducing characteristic of the magnetic storage apparatus are stored in a register.

21. The magnetic storage apparatus according to claim 17, wherein when the environment of the magnetic storage apparatus varies, the timing of energizing the high-frequency oscillator is readjusted.

22. The magnetic storage apparatus according to claim 17, wherein the recording/reproducing characteristic is reproduced output or an error rate.

23. The magnetic storage apparatus according to claim 21, wherein the variation of the environment of the magnetic storage apparatus is at least one of the variation of temperature or a pressure change.

24. The magnetic storage apparatus according to claim 17, wherein the magnetic recording medium is a patterned medium.

* * * * *